(12) United States Patent
Petrovich

(10) Patent No.: US 7,668,758 B2
(45) Date of Patent: *Feb. 23, 2010

(54) METHOD FOR COMMUNICATING PRODUCT AND SERVICE RELATED INFORMATION TO A USER BASED ON DIRECTION OF MOVEMENT DETERMINED BY COMPARING THE LOCATION OF AT LEAST TWO DATAFORMS THAT HAVE BEEN READ

(75) Inventor: Adam M. Petrovich, Pittsburgh, PA (US)

(73) Assignee: Symbol Technologies, Inc., Holtsville, NY (US)

( * ) Notice: Subject to any disclaimer, the term of this patent is extended or adjusted under 35 U.S.C. 154(b) by 503 days.

This patent is subject to a terminal disclaimer.

(21) Appl. No.: 11/608,565

(22) Filed: Dec. 8, 2006

(65) Prior Publication Data

US 2007/0083439 A1 Apr. 12, 2007

Related U.S. Application Data

(62) Division of application No. 10/435,971, filed on May 12, 2003, now Pat. No. 7,155,405.

(60) Provisional application No. 60/437,626, filed on Dec. 31, 2002.

(51) Int. Cl.
*G06Q 30/00* (2006.01)

(52) U.S. Cl. .................. 705/27; 705/1; 705/10; 705/14; 705/16; 235/375; 235/376; 235/380; 235/381; 235/383; 235/385; 235/451; 235/471

(58) Field of Classification Search .............. 705/1, 705/10, 14, 15, 26, 27; 235/375, 376, 380, 235/381, 383, 385, 451, 462, 472
See application file for complete search history.

(56) References Cited

U.S. PATENT DOCUMENTS 5,003,472 A 3/1991 Perrill et al.
5,295,064 A * 3/1994 Malec et al. .............. 705/1

(Continued)

FOREIGN PATENT DOCUMENTS

EP 1244043 9/2002

(Continued)

OTHER PUBLICATIONS

International Search Report dated Apr. 20, 2004 for PCT/US03/35757.

(Continued)

*Primary Examiner*—Jeffrey A Smith
*Assistant Examiner*—Adam Levine

(57) ABSTRACT

Architecture for presenting m-commerce transaction data to a user. An m-commerce device includes a device reading apparatus adapted to read a dataform. At least one item for purchase has associated therewith an item dataform readable by the m-commerce device, the item dataform linked to item information of the item. A terminal is provided for interactive presentation of information to the user. The m-commerce device and terminal are in communication over a network such that item information input to the m-commerce device is transmitted to the terminal for interactive presentation to the user.

20 Claims, 14 Drawing Sheets

U.S. PATENT DOCUMENTS

| | | | |
|---|---|---|---|
| 5,821,513 A * | 10/1998 | O'Hagan et al. | 235/383 |
| 5,880,449 A | 3/1999 | Teicher et al. | |
| 6,123,259 A * | 9/2000 | Ogasawara | 235/380 |
| 6,317,718 B1 * | 11/2001 | Fano | 705/1 |
| 6,327,570 B1 | 12/2001 | Stevens | |
| 6,507,279 B2 * | 1/2003 | Loof | 340/572.1 |
| 6,574,549 B2 * | 6/2003 | Cato et al. | 701/200 |
| 7,386,477 B2 * | 6/2008 | Fano | 705/26 |
| 2002/0060246 A1 | 5/2002 | Gobburu et al. | |
| 2002/0133545 A1 * | 9/2002 | Fano et al. | 709/203 |
| 2003/0216960 A1 | 11/2003 | Postrel | |
| 2003/0220835 A1 * | 11/2003 | Barnes, Jr. | 705/14 |

FOREIGN PATENT DOCUMENTS

| | | |
|---|---|---|
| JP | 11-265485 | 4/2001 |
| JP | 2003-076718 | 3/2003 |
| JP | 2002-251571 | 5/2003 |
| WO | 2002003224 A2 | 1/2002 |
| WO | WO 02/099767 | 12/2002 |

OTHER PUBLICATIONS

First Office for Japanese Application Serial No. 2005-508533 mailed Jun. 23, 2009, a foreign counterpart of U.S. Appl. No. 11/612,295.

English Translation of First Office for Japanese Application Serial No. 2005-508533 mailed Jun. 23, 2009, a foreign counterpart of U.S. Appl. No. 11/608,565.

Non Final Office Action for U.S. Appl. No. 11/612,295 mailed Jun. 19, 2009, a related application of U.S. Appl. No. 11/608,565.

* cited by examiner

METHOD FOR COMMUNICATING PRODUCT AND SERVICE RELATED INFORMATION TO A USER BASED ON DIRECTION OF MOVEMENT DETERMINED BY COMPARING THE LOCATION OF AT LEAST TWO DATAFORMS THAT HAVE BEEN READ

CROSS-REFERENCE TO RELATED APPLICATIONS

This application is a Divisional of U.S. patent application Ser. No. 10/435,971, filed on May 12, 2003 and entitled: IDENTIFICATION SCHEME FOR A COMMUNICATION DEVICE, which claims the benefit of priority to U.S. Provisional Patent Application Ser. No. 60/437,626, filed on Dec. 31, 2002 and entitled: "IDENTIFICATION SCHEME FOR A COMMUNICATION DEVICE". The entireties of these applications are incorporated herein by reference.

TECHNICAL FIELD

This invention relates to portable computing devices, and more specifically, to architecture for identifying an m-commerce device with an m-commerce transaction.

BACKGROUND OF THE INVENTION

The emergence of mobile commerce (commonly known as "m-commerce") on retail sales is impacting the manner in which business is currently conducted. The m-commerce initiative improves a shopping experience by employing technology such as hand-held computers and wireless data networks to enable direct interaction between retailers and customers as they shop. A customer can now access information to facilitate a purchase from most any location. Information will be substantially available for any one, anywhere, and at any time. Retailers can communicate with customers in a timely and relevant manner by promoting products in-aisle and at the point-of-decision. Such technology supports transactions and personalized promotions based on customer-specific characteristics-including past purchase history, current market basket composition or even location within the store. While a customer shops in a store, targeted marketing messages can be sent directly to the customer via his or her m-commerce device based upon contents of their shopping basket, their respective location in the store, or other triggers. Shopping totals are computed and savings are automatically calculated. Marketing possibilities are virtually limitless. Promotions can be delivered in the form of banners scrolling across mobile-device screens offering deals on competitive or affiliated products, static bitmaps, or "animated" bitmaps. Consumers could be reminded to purchase items based on current and/or past market-basket composition or their location in the store. New revenue streams and cooperative marketing models for retailers and their vendors will be generated for retailers who capitalize on the mobile commerce revolution.

However, the design of devices adapted for mobile commerce technology can still make use of the technology cumbersome or inconvenient. For example, in a shopping environment, the customer will eventually have to complete the purchase transaction by paying for the items selected. This typically involves going to a checkout station to have the contents of the mobile device downloaded or transferred via a wired or wireless communications network. The device is than inserted into a cradle or similar equipment to facilitate download of the customer purchase information.

What is needed is a scheme and/or mechanism for providing a more efficient and productive shopping experience when using an m-commerce device.

SUMMARY OF THE INVENTION

The present invention disclosed and claimed herein, in one aspect thereof, comprises architecture for presenting to a user m-commerce transaction data. An m-commerce device includes a device reading apparatus adapted to read a dataform. At least one item for purchase has associated therewith an item dataform readable by the m-commerce device, the item dataform linked to item information of the item. A terminal is provided for interactive presentation of information to the user. The m-commerce device and terminal are in wireless communication over a network such that when the user causes the m-commerce device to read a terminal dataform associated with the terminal, item information input to and stored in the m-commerce device is transmitted wirelessly to the terminal for interactive presentation to the user via the terminal.

In another aspect thereof, there is provided architecture for presenting to a user m-commerce transaction data. An m-commerce device includes a device reading apparatus adapted to read a dataform. At least one item for purchase has associated therewith an item dataform readable by the m-commerce device, the item dataform linked to item information of the item. A terminal is provided for interactive presentation of information to the user. The m-commerce device and terminal are in wireless and/or wired communication over a network such that when the user causes the terminal to read a device dataform of the m-commerce device, item information input to the m-commerce device is transmitted to the terminal for interactive presentation to the user via the terminal.

In another aspect thereof, there are provided one or more signs that include machine-readable dataforms that the customer can scan with the m-commerce device. The dataform may be placed next to generically descriptive text on the sign, which sign may then be located proximate the product and/or service (or item of commerce) offered for sale. The sign may also include readable dataforms associated with products and/or services offered for further informational inquiry only. The sign further includes a logo or emblem that provides easy viewing by the customer such that the logo indicates that the associated product and/or service is being offered as part of a promotional program. The customer can easily identify the location of the promotional items by the presence of the sign and logo in the aisle close to the affiliated items.

Other notification means include the use of signboards that include a list of promotional items and associated machine-readable dataforms. The signboard also includes an easily identifiable logo or symbol such that when noticed, the customer is made aware that the item listed on the signboard are of a promotional and/or discounted nature. The logo or symbol includes the readable dataform. The signboards need not be placed proximate to the promoted item, but may be placed in a central location more readily accessible to a number of customers, for example, at aisle ends, or more open areas. The customer may then simply scan any number of the listed items on the signboard, the listed items being those found in the associated aisle(s), instead of being required to walk those aisles.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
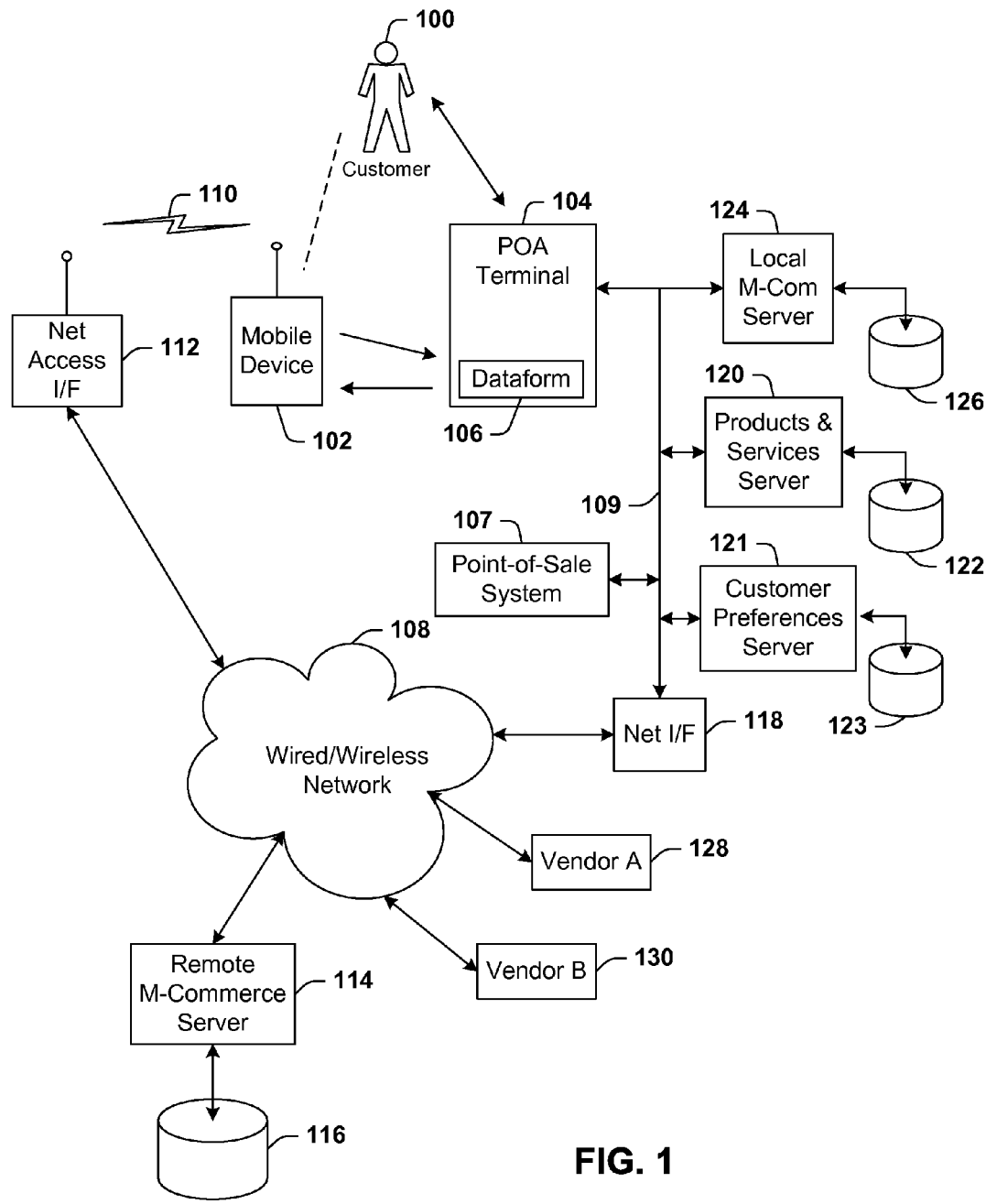
FIG. 1 illustrates a flow block diagram of the disclosed architecture where the dataform is located at a store terminal.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The present invention provides a more effective and productive architecture for an m-commerce customer by associating and presenting point-of-activity (POA) data to the customer at a POA location. The customer POA data can include product and/or service offerings (i.e., items of commerce) of one or more vendors, as well as personal information related to credit, addresses, account numbers, past purchases, and customer preference information. The POA data can be obtained by means of a portable m-commerce device that has a bar code scanning capability, or some other type of input, e.g., RFID (radio frequency identification), either separate from the bar code capability, or in addition to the bar code scanning capability.

RFID is an automatic data capture technology that comprises small data-carrying tokens (or "tags"), and fixed or mobile scanners ("readers"). Tags are attached to or embedded in objects to be identified. Readers may be installed at locations where data capture is required, and may also be in the form of portable readers. Data captured from tags is transferred between distributed readers and a host environment via wire or wireless serial communications links. Readers and tags communicate using low power RF signals. Tags typically are based on a custom designed silicon integrated circuit. Data may be read from and written to tags by readers. Through the application of RFID, items may be tracked automatically and without human intervention, minimizing time involved in identification processes, and with high integrity of data capture.

Thus the customer roams a store scanning offered products and/or services, which he or she may ultimately want to purchase. When ready to complete the purchase transaction, the customer approaches a transaction terminal (or POA terminal) of the store, which terminal includes a readable dataform or "license plate" (e.g., a bar code, graphically printed indicia) that can be conveniently read by the customer m-commerce device. Once the device scans the license plate, a logical association is made between the customer and the POA terminal, and information is transmitted from the device in the form of a conventional data protocol (e.g., XML (eXtensible Markup Language)) to facilitate retrieval of a location address of the POA terminal such that POA data of the customer stored in the m-commerce device is presented to the customer at the POA terminal. This information may be based upon items scanned (in the "shopping cart") or desired product and/or promotional offers (a "wish list") that provide high value to the customer. The customer can then peruse a listing of the items utilizing interactive capabilities provided by the POA terminal to select one or more items for purchase and/or further inquiry.

The license plate includes an encoded identifier that uniquely identifies or is uniquely associated with the location of the POA terminal or location of a product or service. The dataform of the license plate can be any type of conventional readable dataform or combination of dataforms, including but not limited to, a bar code that is read optically by an optical scanner of the device, a magnetically encoded strip that is readable by a magnetic reader, an attached or embedded active or passive transponder that can be electronically pulsed to transmit data stored therein, etc. Alternatively, the license plate can be a product brand logo having the readable dataform embedded therein.

It is to be appreciated that any of a number of probabilistic-based or statistical based approaches to associate the license plate with an entity or component can be employed. In particular, classifiers can be employed including, for example, Support Vector Machines (SVMs). Other classification approaches include Bayesian networks, decision trees, and probabilistic classification models providing different patterns of independence may be employed. Classification as used herein also is inclusive of statistical regression that is utilized to develop models of priority.

According to one aspect of the invention, SVMs that are well understood are employed as a classifier. It is to be appreciated that other classifier models may also be utilized such as Naive Bayes, Bayes Net, decision tree, and other learning models. SVMs are configured via a learning or training phase within a classifier constructor and feature selection module, for example. A classifier is a function that maps an input attribute vector, $x=(x1, x2, x3, x4, xn)$, to a confidence that the input belongs to a class—that is, $f(x)=confidence(class)$.

An aspect of SVMs and other inductive-learning approaches is to employ a training set of labeled instances to learn a classification function automatically. The training set is depicted within a data store associated with the classifier constructor. The training set may include a subset of groupings $G_1$ through $G_N$ that indicate potential and/or actual elements or element combinations (e.g., bar code indicia, text, images . . . ) that are associated with a particular category. The data store also includes a plurality of categories 1 through M, wherein the groupings can be associated with one or more categories. During learning, a function that maps input features to a confidence of class is learned. Thus, after learning a model, categories are represented as a weighted vector of input features.

Referring now to FIG. 1, there is illustrated a flow block diagram of the disclosed architecture. A customer 100 enters a store with a portable device 102 (also denoted as a "mobile device") suitably adapted with m-commerce capability. Alternatively, the store may provide to the customer a portable device for use within the store. After roaming the store and scanning with the device 102 products and services offered for purchase, the customer 100 approaches a POA transaction station (or terminal) 104. The POA terminal 104 is configured with a readable POA dataform 106 and the customer portable device 102 includes the capability to read the dataform 106. Thus the customer 100 controls the device 102 such that the dataform 106 can be read. Once the dataform 106 is read, the device 102 automatically operates to format and transmit data therefrom.

The dataform 106 includes POA location data (or unique address information) representative of the location of the POA terminal on a network 108. The device 102 includes device information that uniquely identifies the device 102. Further, the device 102 has stored therein POA purchase data that defines those items of potential purchase scanned by the customer 100 while in the store. Alternatively, the device 102 can access this data via the network 108 and local server 124 or remote server 114. Thus once the dataform 106 has been scanned, the device 102 automatically formats the dataform data and the POA purchase data for wireless transmission. The combined data set is then transmitted in bulk from the device 102. Note that the process of transmitting can be either configured to occur automatically or manually. When performed automatically, the customer 100 need not provide any input to facilitate the transmission. If transmission is configured to be performed manually, the customer 100 must interact with the device 102 to cause the transmission to occur, e.g., by selecting a "send" option, or the like.

Transmission of the dataform data and POA purchase data occurs over a wireless link 110 to a wireless network access interface 112, such as an IEEE 802.11b access point device located in the store. It is appreciated that many other conventional types of wireless communication technologies can be utilized, including but not limited to, infra-red, RF, and Bluetooth, including wireless wide area networks (WANs) such as cellular and data networks. The access interface 112 provides network access to the network 108, which in this embodiment is a global communication network (e.g., the Internet), but may also be a WAN, LAN, or other network that provides the disclosed connectivity capabilities. It is to be appreciated that the network access interface 112 may also be operatively disposed on a local store network 109 such that the communication through the network access interface 112 is directly to services provided on the local network 109.

Disposed on the network 108 is a remote m-commerce server 114 that hosts a database 116 of relationships between a large number of the POA location data and the dataforms 106. The POA location data can include not only the network location of the POA terminal 104, but also a listing of the products and/or service selected for purchase or further inquiry. The server 114 is suitably capable of performing a look-up operation of the database 116 utilizing the dataform 106 to obtain the corresponding network address of the POA terminal 104. The POA purchase data is then routed to that network address via the network 108 through a network interface 118 to the POA transaction terminal 104 over the local store network 109 for presentation to the customer 100. Note that the POA terminal 104 may access the LAN/WAN 108 either in a wired or wireless fashion according to conventional network architectures. It is to be appreciated that instead of the POA data being forwarded from the remote server 114 along with the address of the POA terminal 104, the POA terminal 104 is notified of the availability of the purchase data at the remote server 114, such that after being notified, the POA terminal retrieves the purchase data from the remote server 114 for presentation to the customer 100.

Disposed on the local network 109 is a products and services server 120 that contains a database 122 of all products and services offered by the store(s) for sale or inquiry to the customer 100 while roaming the store. Of course, the database 122 and server capabilities provided by the products server 120 can also be incorporated into the POA terminal 104. However, in practical application, there will be numerous POA terminals 104 located about the store for use by a large number of customers 100 and thus the products server 120 will be separate from the terminal 104. The products and services server 120 may also be tightly integrated into a point-of-sale (POS) system 107 of the store, which POS system 107 is typically utilized to perform transaction support at a checkout counter.

When the POA purchase data arrives at the POA terminal 104, the purchase data is then extracted from the data packets, and not only presented to the customer 100, but used for transmit to the products and services server 120 to obtain additional related information for presentation to the customer at the terminal 104. This additional information may include customer information uniquely associated with the customer 100, e.g., name, address, customer personal credit account information, and more. In more robust implementations, the customer information can include buying habit information of the customer 100 that is developed over time as the customer 100 shops at the store, or any store in a network of stores subscribing to the disclosed architecture. For example, as a condition for participating in the disclosed architecture of store, the customer 100 must complete an application that inquires of the customer preferences or dislikes across a wide variety of information. These preferences are then used to present information to the customer 100 when at the terminal 104 or even to the device 102 while the customer roams the store. The preferences information can be stored in any network location either local or remote to the store; however, the illustrated location is locally on a customer preferences server 121 and associated database 123.

It is appreciated that in an alternative implementation, instead of the scanned product and/or service information being transmitted as a bulk transfer from the device 102 after the customer 100 approaches the POA terminal 104, each purchase scan results in a single transmission of the scanned product or service information to a network storage location. As the customer 100 scans a product or service for purchase, the device 102 automatically transmits that product or service information for that single purchase event along with unique device ID (UDID) information through the network 108 to be stored in association with the customer account in a unique storage location, e.g., the remote m-commerce server 114 (and database 116) or preferences server 121 (and database 123) on the local store network 109. Thus purchase events are accumulated on the network server. Once the customer 100 approaches POA terminal 104, the device 102 scans the dataform 106, and the association of the customer 100 with the location of the POA terminal 104 is made so that the accumulated purchase event data is retrieved from the network server for presentation to the customer 100 at the POA terminal 104.

Alternatively, the network 108 is not a remote global communication network, such as the Internet, but is consolidated into the single store LAN 109 such that there is provided a local m-commerce server 124 and local database 126 providing the capabilities of the remote m-commerce server and database (114 and 116) in a local network setting. Thus the POA purchase data and the dataform information are transmitted wirelessly through the network 109 to the local m-commerce server 124 in order to obtain the network address of the POA terminal 104 that corresponds to the terminal 104 at which the customer 100 is present. Additionally, it is to be appreciated that the m-commerce server 124, products and services server 120, and customer preferences server 121 are not limited to residing on separate network computers, but can all reside on a single server or combinations of server machines. Furthermore, the servers 120 and 121 can be disposed on a network remote from the store, for example, the network 108, or any other network that is accessible to facilitate the flow of information to various devices such as the POA terminal 104 and the mobile device 102. As a further example, it is appreciated that the device 102 is capable of receiving, processing, and presenting web clips (specially formatted web pages for presentation smaller web-capable devices) of information to the customer 100 such that if, e.g., a favorite soap product A is scanned, that soap product information is used to obtain further information about that soap product or other soap products currently being promoted by the soap vendor. This soap information can be hosted locally on the local products and services server 120, or linked via the products server 120 to remotely access that soap information from a Vendor A server 128 disposed on the global communication network 108. Alternatively, the remote m-commerce server 114 can host the vendor information such that the remote m-commerce server 114 is accessed for the vendor information.

In either case, the customer 100 or the store can be charged for the interaction with the vendor information database, for example, Vendor A 128 (and other vendors) on a per access basis via the network 108, or wherever the vendor information servers are disposed. The access cost, which may be a few cents per access can then be charged back using an accounting system that forwards the access cost information to the store to either add to the customer transaction purchase or to the store account. If charged to the store account, these access costs can be recouped through, for example, the inclusion in the costs of other product and/or service. In order to provide information suitable for presentation on the device 102, certain device type information would also need to be transmitted so that the web information can be properly formatted for either text and/or graphical presentation to the customer 100. Similarly, if the customer 100 indicated in his or her preferences that they would want stock information communicated to the device 102 while they shop, such information can be provided by accessing a Vendor B server 130 disposed on the network 108 and transmitting the stock information over the network 108 to the device 102 via the wireless access interface 112. The type and amount of information provided to the customer 100 while shopping in the store is virtually unlimited.

The POA terminal 104 may be a kiosk suitably configured for network transactions, such that when the customer 100 is presented the information at the terminal 104, other web-based features are provided for accessing further information. A unique feature of this solution is that the user completes "navigation" prior to approaching the POA terminal 104. For instance, where the kiosk is a wine steward that may be networked to an Internet-based wine content provider, wine could be selected by choosing an item in a current list or basket, e.g., "Salmon", choosing or touching a wine-suggestion button or using preferences, past purchase history (e.g., "$1 off Kendal Jackson wine") information through which highly relevant wine suggestions are made. This is but one example, since this could also be used for many other implementations, such as for accessing nutritional information, recipes, etc., all in the same manner. The POA terminal 104 can include a touch screen for interactive capability or any conventional interactive tools. In a more robust implementation, the terminal 104 can include voice-activated control such that the customer 100 interacts by voicing options and selections made available.

It is appreciated that the while the customer 100 shops the store, advertising, customer preference information, and/or product and service information can be transmitted by the store systems through the network 108 to the portable device 102 such that the customer 100 can be presented with this information while shopping, or presented with this information in response to a real-time customer inquiry while shopping.

Figure 2:
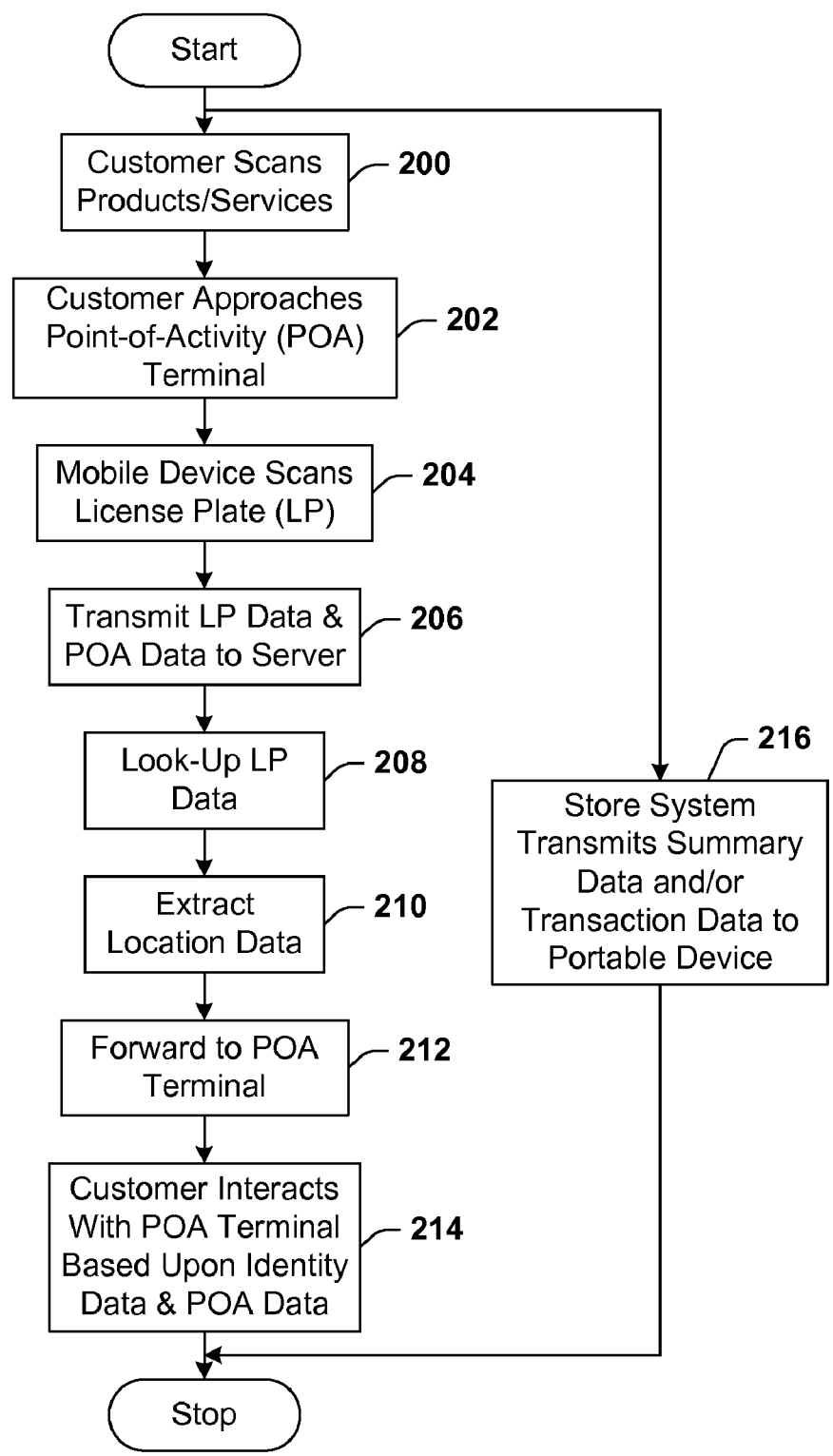
FIG. 2 illustrates a flow chart of the process of the system of FIG. 1.

Referring now to FIG. 2, there is illustrated a flow chart of the process of the system of FIG. 1. For purposes of simplicity of explanation, the methodologies illustrated herein in the form of flow charts are shown and described as a series of acts. However, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention. Flow begins at a Start block and moves to 200 where the customer 100 shops and scans various products and/or services for further inquiry and potential purchase. At 202, the customer 100 approaches the POA terminal 104. The portable device 102 than scans the license plate (LP) dataform 106 of the POA terminal 104, as indicated at 204. At 206, the device 102 then transmits the LP dataform data and purchase data to the remote m-commerce server 114. The server 114 performs a lookup operation on a database 116 of dataform and POA terminal associations, as indicated at 208. Note that the purchase data may be transmitted before the customer 100 approaches the terminal 104. At 210, the location data or address of the POA terminal 104 is retrieved from the lookup operation. The POA data is then forwarded to the POA terminal 104 and presented to the customer 100, as indicated at 212. The POA terminal 104 is suitably configured to allow the customer 100 to interact therewith such that one or more of the products and services previously scanned by the customer 100 can now be confirmed for purchase, deleted from purchase, and/or have further information provided, as indicated at 214. Other data (e.g., preference data) can be presented based upon the identity of the customer 100.

As indicated hereinabove with respect to FIG. 1, the customer 100 can receive information via the device 102 at any point during the shopping experience. This is indicated at 216, which extends in parallel from the input of 200 to the output of 214. This can be initiated by the customer 100 providing an indication to the store system of his or her presence in the store. The store system will then retrieve and transmit encrypted customer information to the device 102. The information is addressed to the specific customer and encrypted so that other customers in the store using a device in the same frequency range will not be able to perceive other customer information. This indication can be facilitated by the dataform 106 being scanned at a store entry point as the customer 100 enters the store. The transmission is triggered to cease either after the customer 100 completes the transaction at the POA terminal 104 or by signaling exit of the store system as the customer 100 passes through the same activation or trigger system when he or she entered the store. Flow then reaches a Stop block.

Figure 3:
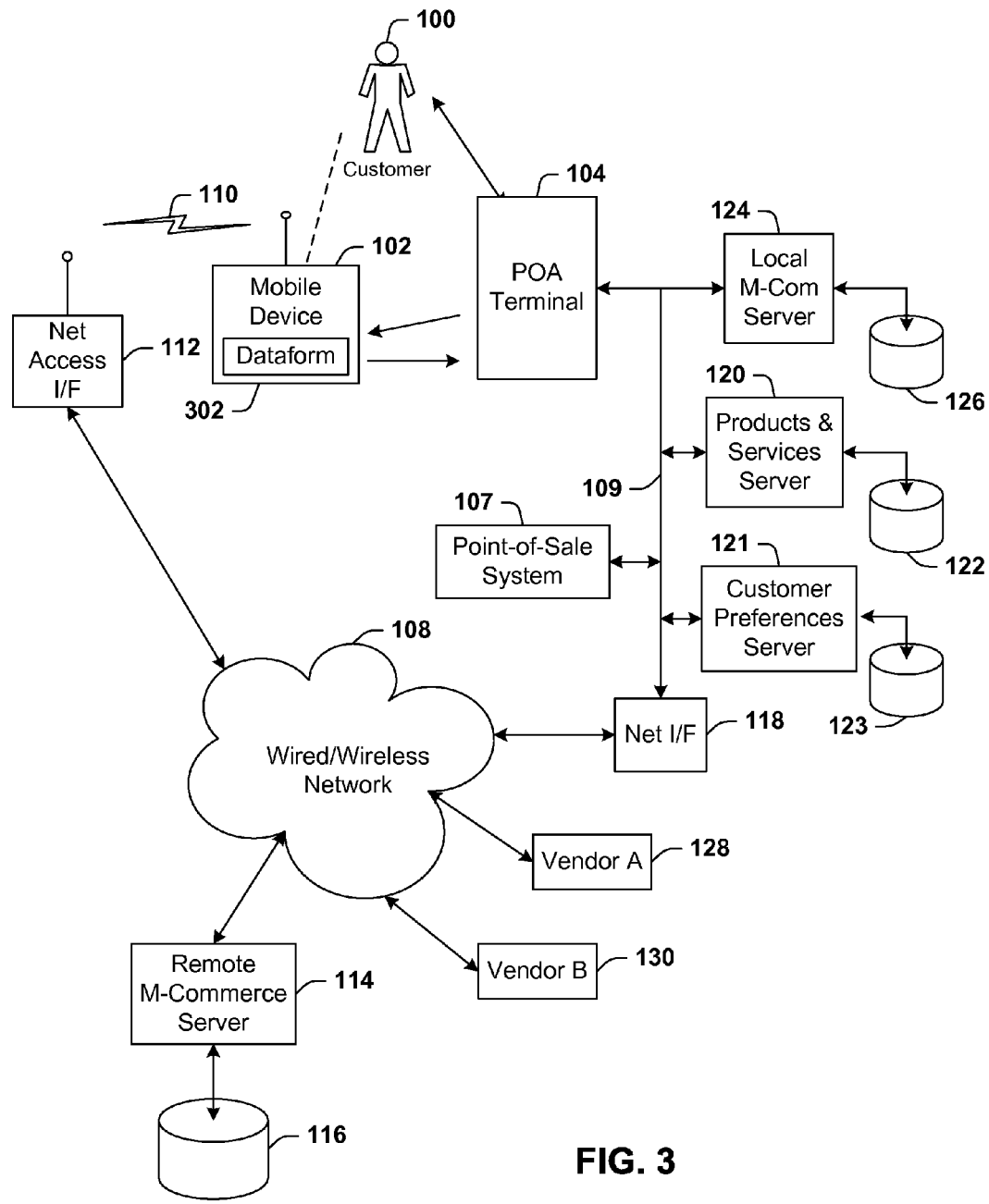
FIG. 3 illustrates a flow block diagram of an alternative system 300 where a device dataform 302 is included with the portable device.

Referring now to FIG. 3, there is illustrated a flow block diagram of an alternative system 300 where a device dataform 302 is included with the portable device 102. In this particular application, the customer 100 roams the store to scan products and/or services for purchase, but when approaching the POA terminal 104, the terminal 104 includes sensing architecture that reads the device dataform 302. The dataform 302 includes device information that uniquely identifies the device 102 (e.g., the UDID), and can be utilized further for association with a specific customer 100. The customer 100 transmits the purchase data along with the dataform information to the remote server 114 for storage. Note that the purchase data may be transmitted at anytime, and is not limited to transmission when the customer 100 is at the terminal 100. The POA terminal 104 operates to use the scanned dataform 302 to retrieve the data associated therewith from the remote server 114 by querying the server 114 over the local network 109 to the network 108. Additionally, data may be transferred to the POA terminal 104 via local RF (e.g., Bluetooth), infrared, or by displaying a data file of information in the form of a two-dimensional symbology, such as PDF417, on the display of the mobile device 102, and then reading it into the POA terminal 104. This information may then be transmitted to the appropriate server(s) over the LAN/WAN 108.

PDF stands for "Portable Data File", which is a two-dimensional symbology that carries up to 1.1 kilobytes of machine-readable data in a space similar to that of a standard bar code. Unlike traditional one-dimensional bar codes, which depend on real-time links to a larger database, PDF417 symbols are the database. PDF417 symbols are provided in association with paper, packages, or parts. The symbology can exchange complete data files (such as text, numerics, or binary) and encode graphics, fingerprints, shipping manifests, electronic data interchange (EDI) messages, equipment calibration instructions, and much more. PDF417 provides a powerful communications capability without the need to access an external database. Moreover, because PDF417 is a machine-readable method of transporting data, it eliminates time-consuming and error-prone manual data entry. It functions as a paper-based computer memory that can be written once and read over and over again. And, as a universal machine language, it communicates with all host operating systems. PDF417 encodes full ASCII, numeric or binary data, and uses sophisticated error correction algorithms to keep the data intact, even when as much as half the symbol is damaged.

If the purchase data has not been transmitted to the remote server 114 from the device 102, the POA terminal 104 will continue to transmit a query until the purchase data is accessible. When the purchase data (or more broadly defined as the item information) arrives at the remote server 114 from the device 102, it is stored in a table on the storage unit 116. The remote server 114 performs a lookup operation to match the scanned dataform received from the POA terminal 104 to corresponding dataform information. When matched, the purchase data is retrieved to the POA terminal 104 and presented to the customer 100. The POA terminal 104 than retrieves the purchase information from the remote server 114, uses the product and/or service identifiers to further retrieve product and service information from the product server 120, and presents the information to the customer 100. This information can also be retrieved directly from the vendor websites (128 and 130).

The process of using the device dataform 302 to retrieve the associated transaction information from the m-commerce server 114 can trigger other events to occur, such as presenting additional advertising, target information, or promotions to the customer 100 while at the POA terminal 104. Targeted and preference information can also be presented according to the customer shopping preferences, or any other information obtained during the subscription process, e.g., weather, news, store specials in various classes of merchandise, etc.

In an alternative application environment, the architecture of the present invention may be used anywhere to provide association (and billing) of mobile devices to fixed devices and services. Another example would include the implementation in an airport where business services are made available via a service system having the POA terminal 104 such that a traveling mobile customer needs to access his or her personal e-mail account, print the e-mail message and/or attached document, read and approve the document, and perhaps transmit the approved document. The customer may then approach the service system that interrogates (e.g., scans a dataform of the mobile device or activates a transponder to retrieve an embedded code) the mobile device 102, or the device 102 interrogates the service system. An association is made between the service system (via the POA terminal 104) and the customer (via the mobile device 102) such that the document may then be transmitted to the service system to be printed out in hardcopy for review and signature, displayed for review and digitally signed, etc. The capability to print the document(s) may be displayed as a selectable option on the mobile device 102 via an e-mail application option and/or the service system. Once the document is processed by printing or digitally signing, the transaction may be charged to the customer in a conventional manner such as billing the service back to the wireless account associated with the mobile device 102, billing according to customer preferences account information, or any number of different accounting and billing methods.

Figure 4:
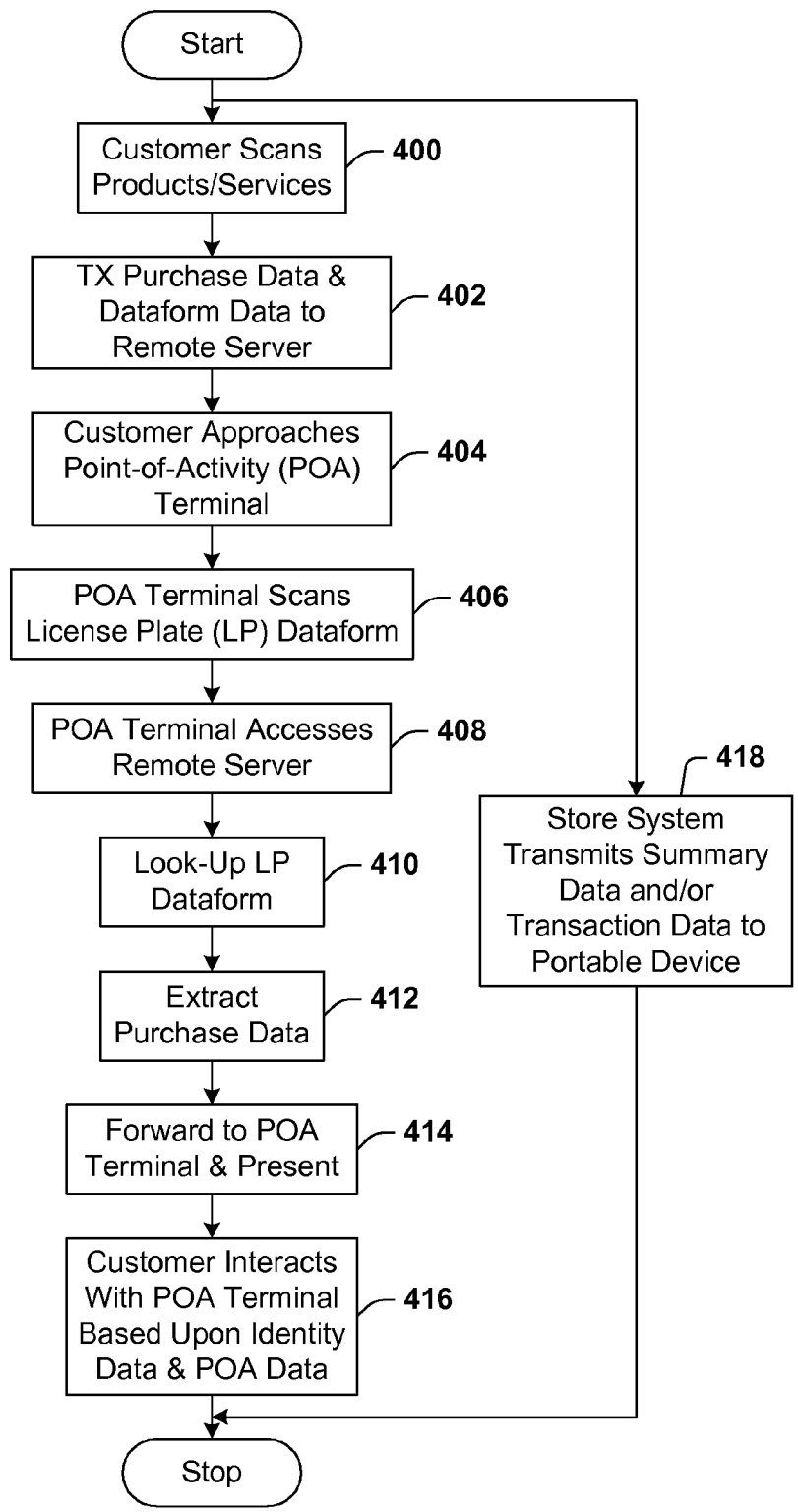
FIG. 4 illustrates a flow chart of the process of the system of FIG. 3.

Referring now to FIG. 4, there is illustrated a flow chart of the process of the system of FIG. 3. Flow begins at a Start block and moves to 400 where the customer 100 shops and scans various products and/or services for further inquiry and potential purchase. At 402, the customer 100 transmits the purchase data and dataform data to the remote server 114. The customer 100 then approaches the POA terminal 104, as indicated at 404. As indicted previously, the purchase data may be transmitted at anytime before or after the customer approaches the terminal 104. However, it is preferable that the data be transmitted before such that the data is made readily available for presentation to the customer 100 when at the POA terminal 104. The POA terminal 104 than scans the license plate dataform 302 of the device 102, as indicated at 406. At 408, the POA terminal 104 accesses the remote server 114 to determine if any purchase data has arrived associated with the scanned dataform 302. The server 114 performs a lookup operation on the database 116 of dataform and purchases data associations using the received dataform data, as indicated at 410. At 412, the purchase data is retrieved from the lookup operation. Note that purchase data may also be extracted from the mobile device 102. The purchase data is then forwarded to the POA terminal 104 and presented to the customer 100, as indicated at 414. The POA terminal 104 is suitably configured to allow the customer 100 to interact therewith such that one or more of the products and services previously scanned by the customer 100 can now be confirmed for purchase, deleted from purchase, and/or have further information provided, as indicated at 416. Other data (e.g., preference data) can be presented based upon the identity of the customer 100.

As indicated hereinabove with respect to FIG. 3, the customer 100 can receive information via the device 102 at any point during the shopping experience. This is indicated in 418, which extends in parallel from the input of 400 to the output of 416. This can be initiated by the customer 100 providing an indication to the store system of his or her presence in the store. The store system will then retrieve and address the customer information to the corresponding customer, as well as encrypt the customer information for transmission to the device 102. The information is encrypted so that other customers in the store using a device in the same frequency range will not be able to perceive other customer information. This indication can be facilitated by the dataform 302 being scanned at a store entry point as the customer 100 enters the store. The transmission is triggered to cease either after the customer 100 completes the transaction at the POA terminal 104 or by signaling exit of the system store as the customer 100 passes through the same activation or trigger system when he or she entered the store. Flow then reaches a Stop block. Additionally, the output of 418 can terminate at the input of 416 indicating that additional information of 418 can be presented to the customer 100 before the interaction at the POA terminal 104.

Figure 5:
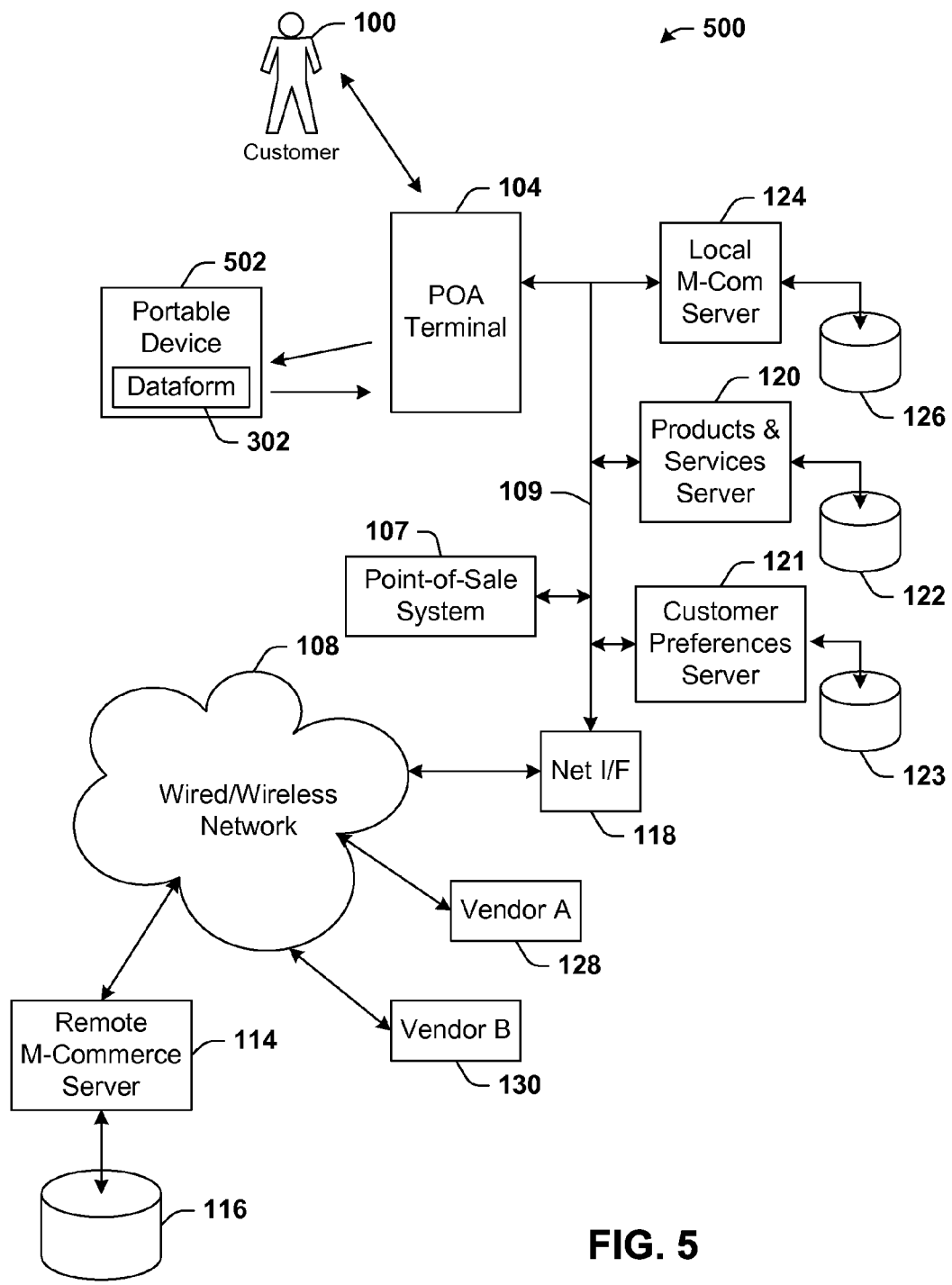
FIG. 5 illustrates a flow block diagram of an alternative embodiment where a portable device lacks wireless communication capability.

Referring now to FIG. 5, there is illustrated a flow block diagram of an alternative system embodiment 500 where a portable device 502 lacks wireless communication capability. The license plate dataform 302 is included with the portable device 502. In this particular application, the customer 100 roams the store to scan products and/or services for purchase, but when approaching the POA terminal 104, the POA terminal 104 includes the sensing architecture that reads the device dataform 302. The dataform 302 includes device information that uniquely identifies the device 502, and which can be further identified with a particular customer 100, where the device is personal to the customer 100. The POA terminal 104 operates to retrieve data associated with the device information by querying a server where the database of purchase information is stored, e.g., hereinabove, at remote server 114. If the purchase data has not been transmitted to the remote server 114, the POA terminal 104 will continue to transmit a query until the purchase data is accessible.

In order to upload the purchase data from the device 502 to the system 500, the customer will need to connect the device 502 to a compatible interface. The interface may be made part of the POA terminal 104 such that the customer inserts the device 502 into a compatible interface slot. The interface capability can also include manually removing a memory card from the device 502, and inserting the memory card into a memory card interface such that the terminal 104 reads the contents of the memory card. The purchase data and associated dataform are then transmitted across the local network 109 and the remote network 108 to the remote server 114 for storage. When the purchase information has been stored therein, and associated with the dataform information, the remote server 114 can find the purchase information during the lookup operation via the scanned dataform information. The purchase information is then transmitted to the POA terminal 104 for presentation to the customer 100. The purchase data can be used to further retrieve product and service information from the product server 120. Of course, the product and service information can also be retrieved directly from the vendor websites (128 and 130). This association process can trigger other events to occur, such as presenting additional advertising or offers to the customer 100 while at the POA terminal 104. Targeted and preference information can also be presented according to the customer shopping preferences, or any other information obtained during the subscription process, e.g., weather, news, store specials in various classes of merchandise, etc., which may be stored on the preferences server 121.

Offers or "electronic coupons" selected on the POA terminal 104 can be electronically downloaded to the mobile device 502. These coupons can be electronically associated with a purchase transaction at any point of payment or can be transferred to the point-of-sale system via a linkage at payment, similar to that of the POA terminal 104.

Figure 6:
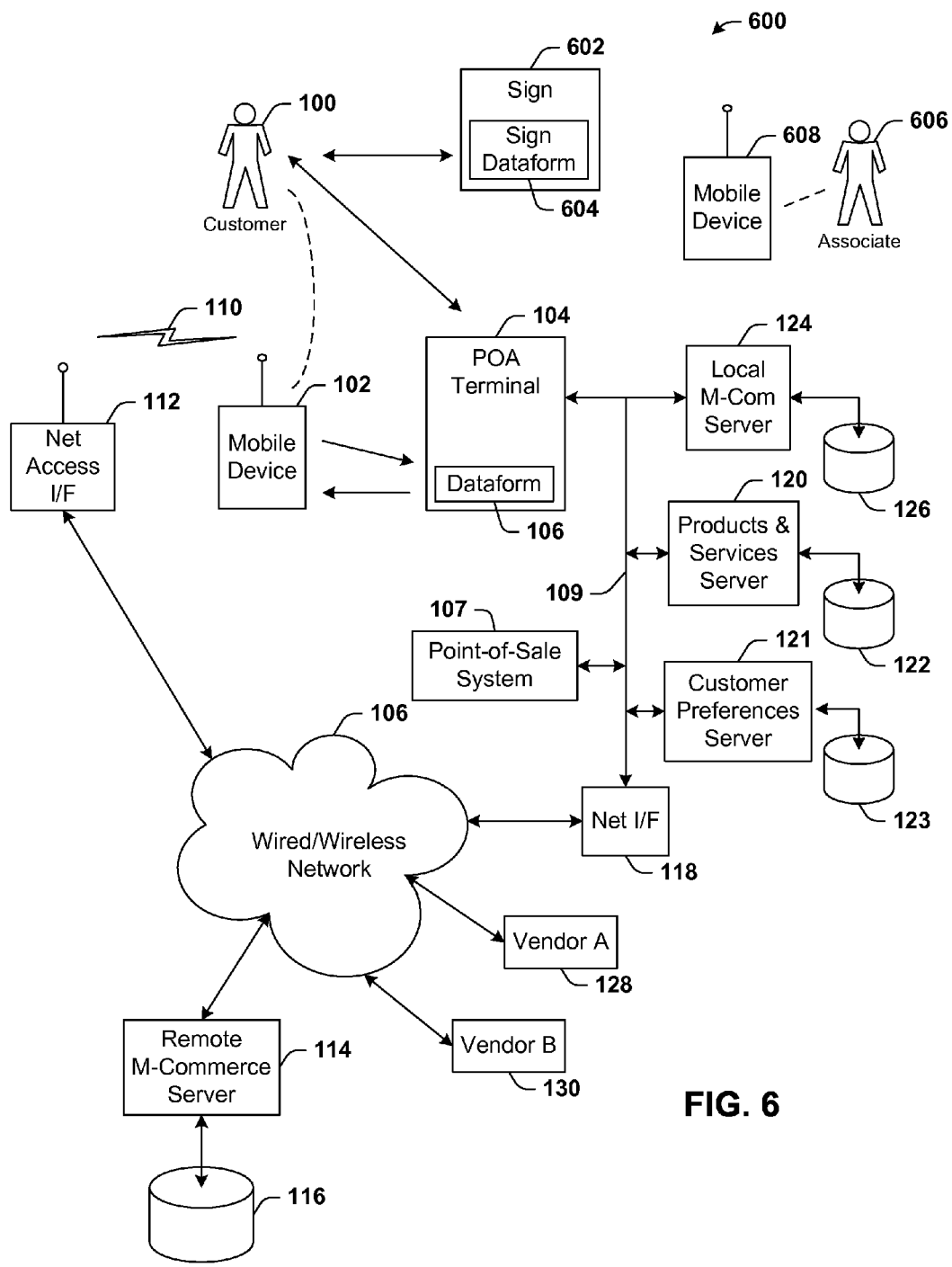
FIG. 6 illustrates a flow block diagram of an alternative system where one or more stationary signs are located throughout the store, for example, on shelves or aisle ends with associated products, for providing a more visual means for attracting customer attention to certain products and/or services being promoted by the store.

Referring now to FIG. 6, there is illustrated flow block diagram of an alternative system 600 where one or more stationary sign(s) 602 are located throughout the store, for example, on shelves or aisle ends with associated products, for providing a more visual means for attracting customer attention to certain products and/or services being promoted by the store. The sign(s) 602 are placed by a store associate 606 in proximity to the products and/or services being promoted. The sign(s) 602 include one or more dataforms 604 associated with products and/or services being promoted. The store associate 606 also utilizes a mobile device 608 in wireless communication with the store network 109 (or network 108) via the network access interface 112 to retrieve information from the products and services server 120 that indicates where to locate the sign(s) 602. The store associate 606 need only scan one of the promoted dataforms 604 on the sign 602, and the corresponding location information for that sign 602 will be returned and presented via the device 608. The location information may include aisle information and general location of the item in the aisle. The location of every product in the store and service promotion information can be stored in a database, for example, the products and services database 122. The associate 606 then accesses this database of location information wirelessly via the mobile device 608 for more expedient placement of the associated sign(s) 602. This placement process can include placement of multiple signs 602 at a number of shelf and/or aisle locations throughout the store, in accordance with sign placement location information retrieved wirelessly from the database 122.

The sign dataform 604 is readable by the mobile device 102 of the customer 100. When the customer 100 sees the sign and desires additional information (e.g., offers, product information, associated product information, recipe information, . . . ), the customer scans the associated dataform 604. The scanned sign dataform 604 is transmitted to the local m-commerce server 124 to retrieve information or offers associated with the product presented on the sign 602. The purchase data and associated dataform data are then transmitted to the remote m-commerce server 114 for storage. When the purchase information has been stored therein, and associated with the dataform data, the remote server 114 can find the purchase information during the lookup operation when utilizing the scanned dataform information. The purchase information is then transmitted to the mobile device 102 via the wireless network interface 112 for presentation to the customer 100. The purchase data can be used to further retrieve product and service information from the product server 120. Of course, the product and service information can also be retrieved directly from the vendor websites (128 and 130).

This association process can trigger other events to occur, such as presenting additional advertising or offers to the customer 100 while at the sign 602. Targeted and preference information can also be presented according to the customer shopping preferences, or any other information obtained during the subscription process, e.g., weather, news, store specials in various classes of merchandise, etc., which may be stored on the preferences server 121.

It is appreciated that the sign 602 is not limited to a single sign dataform 604, but can include multiple dataforms for scanning by the customer, limited only by the size of the sign 602. For example, since the sign 602 would be located among similar products of a manufacturer, the sign 602 may include similar product versions of a same type of product. Using soda as an example, if Vendor A produces a grape, orange, and berry soda, and promotes the purchase of soda any combination of flavors, the sign 602 can include multiple dataforms 604, each associated with a respective soda flavors. The customer can then scan the dataform of any of the soda flavors, in addition to the flavor promoted, for purchase and/or further information.

The scanned sign information can also be stored in association with the customer account for retrieval during a later store-shopping trip. The customer can approach the POA terminal 104 to retrieve this previously stored sign information according to the system operation described hereinabove in FIG. 1.

Figure 7:
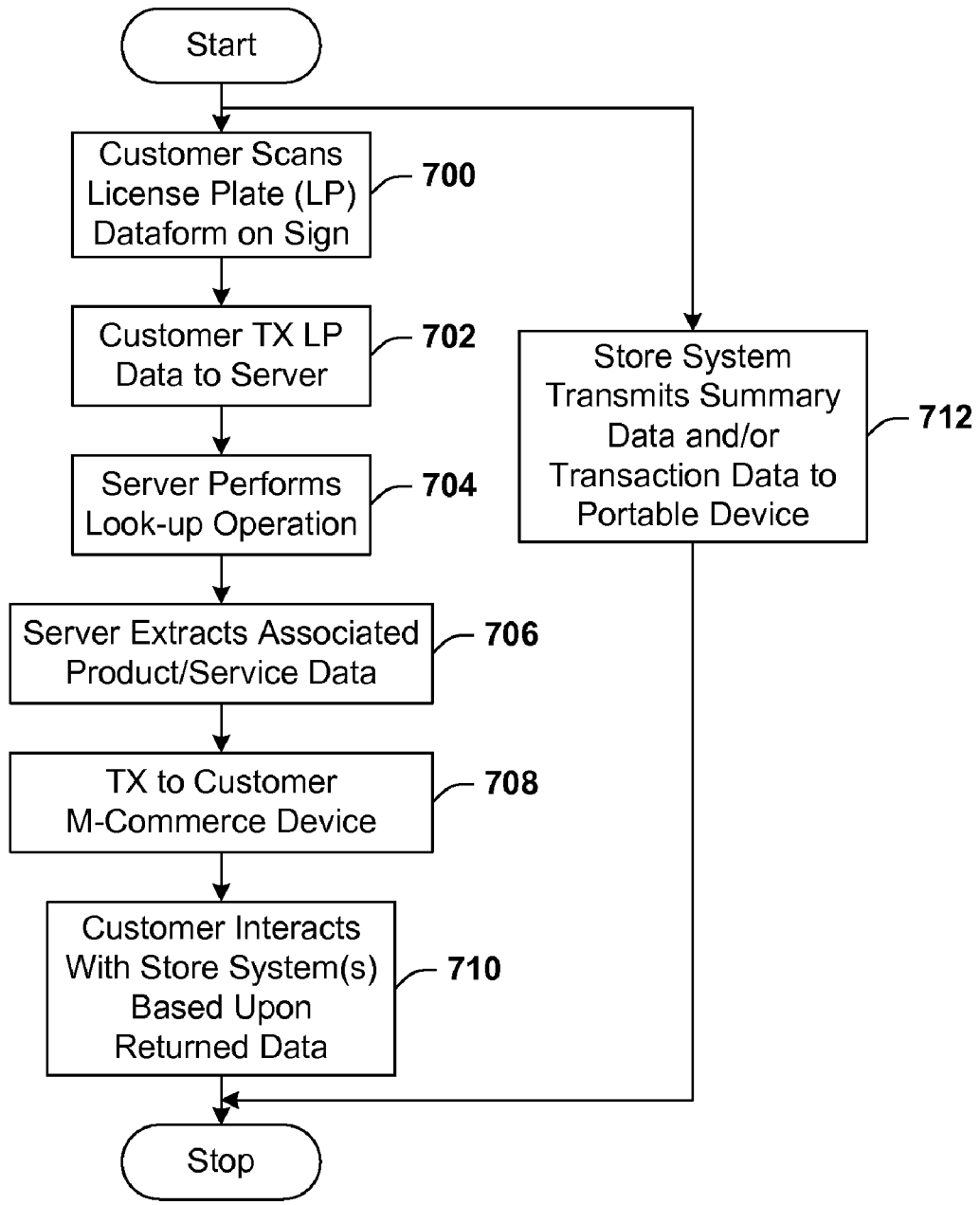
FIG. 7 illustrates a flow chart of the process associated with FIG. 6.

Referring now to FIG. 7, there is illustrated a flow chart of the process associated with FIG. 6. Flow begins at 700 where the customer 100 views the sign and chooses to obtain further information about the product and/or services presented thereon. The customer 100 scans one of the sign dataforms 604 using the mobile device 102. The customer 100 then wirelessly transmits (automatically or manually) the sign dataform data through the wireless network interface 112 over the remote network 108 to the remote server 114, indicated at 702. At 704, the server 114 performs a lookup operation to obtain the product and/or service information associated with the scanned sign dataform 604. After this associated information is retrieved by the server 114, at 706, the information is transmitted from the remote server 114 to the wireless device 102 for presentation to the customer 100, as indicated at 708. At 710, the customer 100 can then interact with the store system(s) based upon the returned data to, for example, select the product/service for purchase, request further information, or not purchase the product/service at all. The remaining features previously mentioned in association with the system of FIG. 1 are also available, for example, network retrieval of vendor information from the vendor servers (128 and 130), all of which have been described in detail hereinabove.

The store system can keep a record of the customer shopping habits by storing information related to this recent inquiry. Thus when the customer 100 returns to the store at a later date, the store system can broadcast the customer preference information and previous product/service purchase and/or inquiry information to the m-commerce device 102 for presentation to the customer 100. This is indicated at 712, which connects in parallel from the input of 700 to the output of 710. Of course, the output of 712 could also flow directly to the input of 710 to facilitate purchase of any of the broadcast product/service information prior to a POA transaction.

Figure 8:
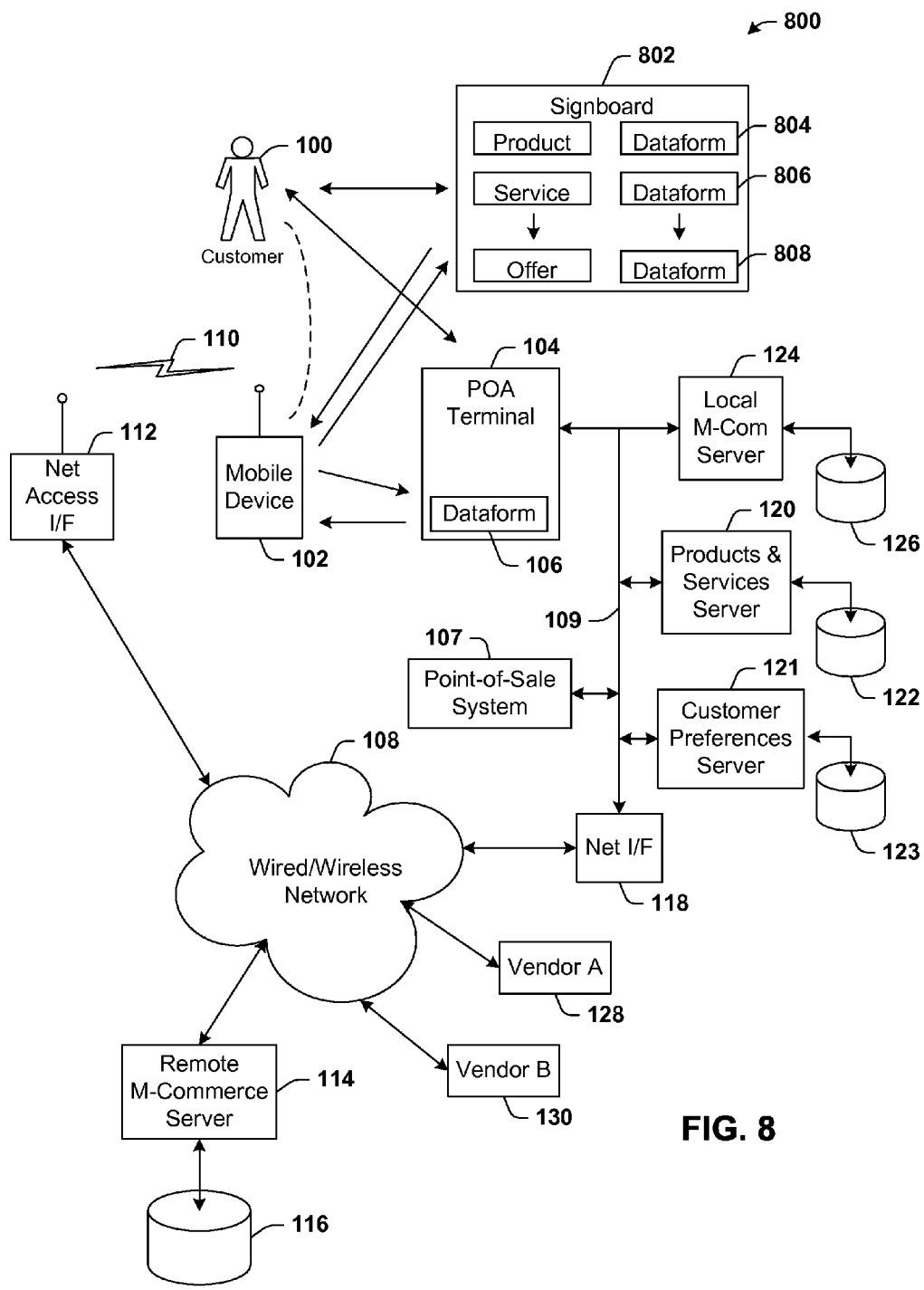
FIG. 8 illustrates a flow block diagram of an alternative system where one or more stationary signboards are located throughout the store, for example, on shelves or aisle ends, for providing a more visual means for attracting customer attention to lists of certain products and/or services being promoted by the store.

Referring now to FIG. 8, there is illustrated a flow block diagram of an alternative system 800 where one or more stationary signboard(s) 802 are located throughout the store, for example, on shelves or aisle ends, for providing a more visual means for attracting customer attention to lists of certain products and/or services being promoted by the store. Each of the listed products, services, offers, etc., has associated therewith a dataform. For a product, product dataform 804 has product text and/or graphics associated therewith, a service dataform 806 has service text and/or graphics associated with it, and an offer dataform 808 has offer text and/or graphics associated with it. Alternatively, the dataforms need not have text associated therewith, in which case, based on the scan, the customer exhibits intent, and the system provides text based upon information.

When the customer 100 sees the signboard 802 and desires additional information (e.g., offers, recipe information . . . ), the customer 100 scans the desired dataform (804, 806, and/or 808) on the signboard 802 associated with the text and/or graphics using the mobile device 102. The scanned dataform data is sent to the local server 124 to retrieve information or offers associated with the dataform. The dataform data is then transmitted over the network 108 to the remote server 114 for storage. When the purchase information has been received, and associated with the dataform information, the remote server 114 can find the purchase information during the lookup operation via the scanned dataform information. The purchase information is then transmitted to the mobile device 102 for presentation to the customer 100. The purchase data can be used to further retrieve product and/or service information from the product server 120. Of course, the product and service information can also be retrieved directly from the vendor websites (128 and 130). This association process can trigger other events to occur, such as presenting additional advertising or offers to the customer 100 while at the signboard 802. Targeted and preference information can also be presented according to the customer shopping preferences, or any other information obtained during the subscription process, e.g., weather, news, store specials in various classes of merchandise, etc., which may be stored on the preferences server 121.

The scanned sign information can also be stored in association with the customer account for retrieval during a later store-shopping trip. The customer can approach the POA terminal 104 to retrieve this previously stored sign information (e.g., stored at any server location) according to the system operation described hereinabove in FIG. 1. The remaining features previously mentioned in association with the system of FIG. 1 are also available, for example, network retrieval of vendor information from the vendor servers (128 and 130), all of which have been described in detail hereinabove.

Figure 9:
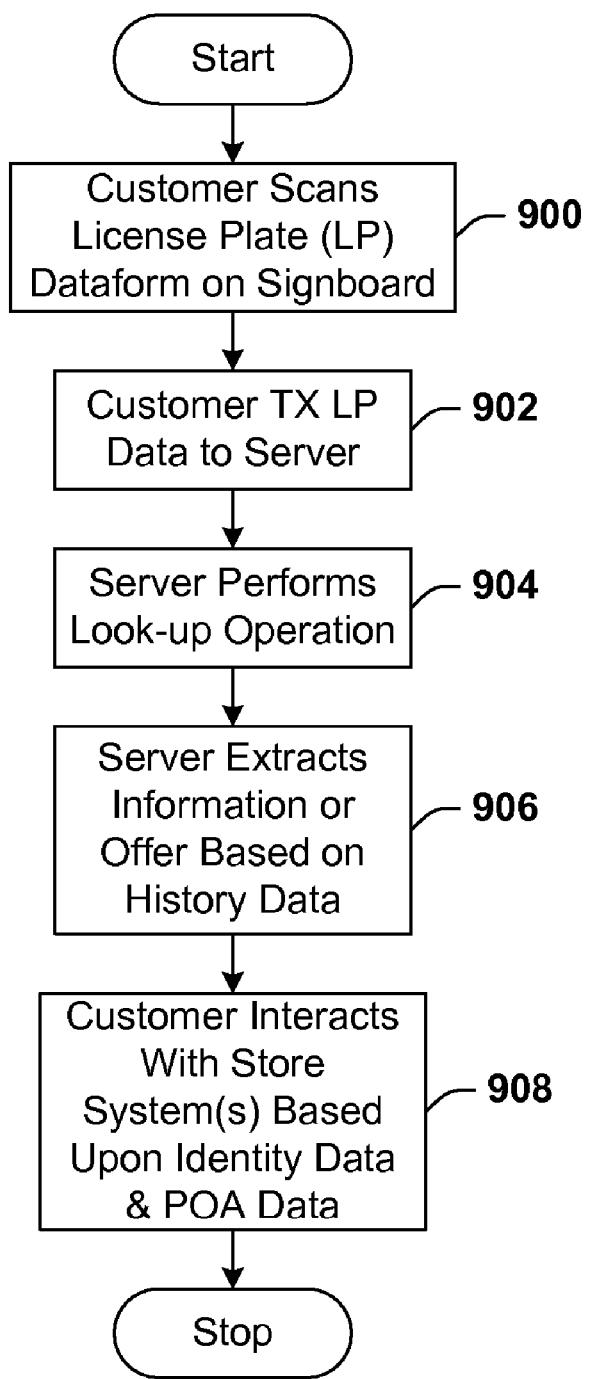
FIG. 9 illustrates a flow chart of the process associated with FIG. 8.

Referring now to FIG. 9, there is illustrated a flow chart of the process associated with FIG. 8. Flow begins at a Start block and moves to 900 where the customer 100 scans signboard dataform on the signboard 802 using the mobile device 102. At 902, the customer 100 transmits the scanned signboard dataform data to the local server 124 for storage and processing to retrieve information and offers associated therewith. The dataform data is also transmitted to the remote server 114 for storage. When the purchase transaction has been completed, the purchase information is also stored on the remote server 114 in association with the dataform data. Note that the dataform data and purchase data can be stored virtually at any suitable data location and at anytime during the shopping process. Thus, at a later time, when the customer 100 returns to the store to shop, the prior purchase information can be retrieved as a result of a lookup operation at 904, and transmitted to the customer device 102 for presentation to the customer 100, as indicated in 906. In addition to, or in lieu of sending the prior purchase information to the customer device 102, related offers and/or product/service information can be transmitted to the customer 100 for review. At 908, the customer 100 can then interact with the store system(s), e.g., the POA terminal 104, to make further inquiries or purchases, as well as via the device 102.

Figure 10:
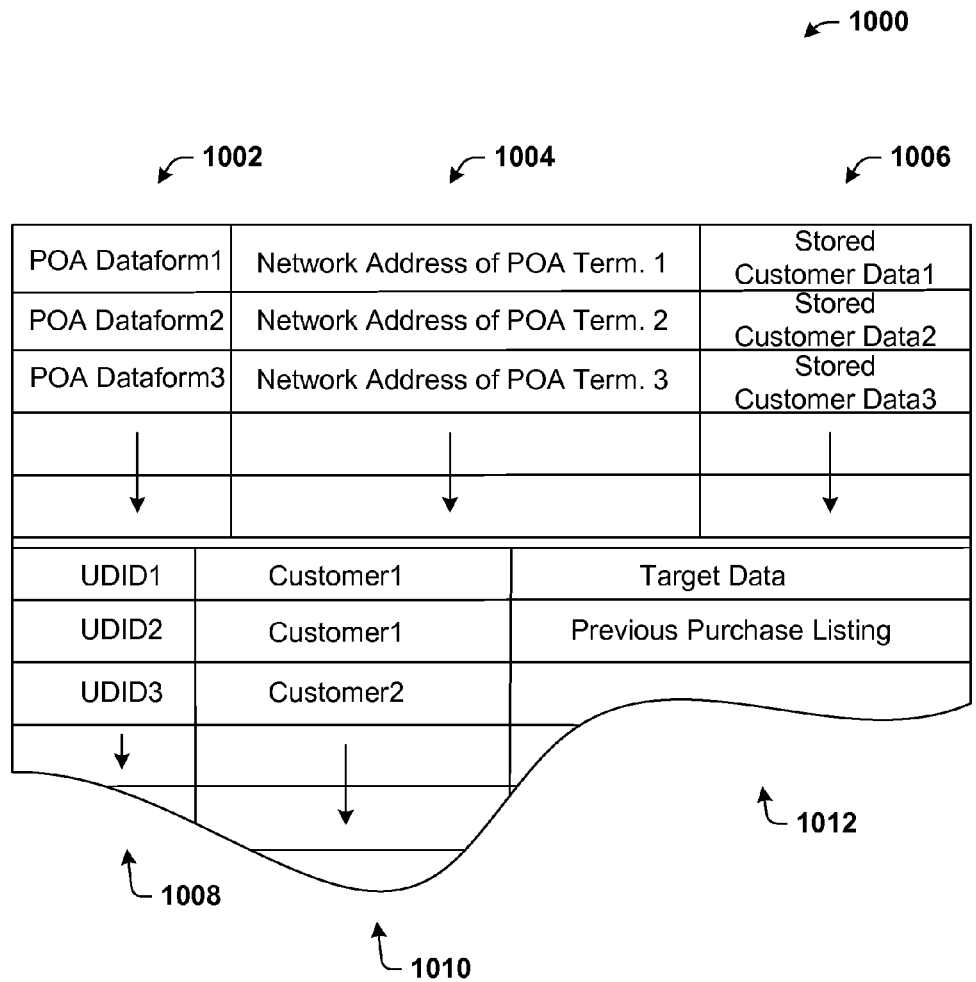
FIG. 10 illustrates an exemplary database of the remote m-commerce server for cross-referencing a dataform with the network location of the POA terminal, according to the system of FIG. 1.

Referring now to FIG. 10, there is illustrated an exemplary database 1000 of the remote m-commerce server 114 for cross-referencing the dataform 106 with the network location of the POA terminal 104, according to the system of FIG. 1. The database 1000 includes a table or similar data structure of a plurality of associations between POA dataforms 1002 (e.g., POA dataform 106) and corresponding network addresses 1004 of POA terminals of the store or terminal of any other store affiliated with the program facilitated by the present invention. The database 1000 is stored on the storage unit 116 of the remote server 114 to facilitate locating the POA terminal 104 that the customer 100 has approached for finalizing the purchase transaction. As indicated hereinabove, the database 1000 can either be stored remotely on the server 114 or locally on the local m-commerce server 124, or both as a means of providing a backup database. Thus once the device 102 has sensed the dataform 106, an association is made between the device 102 and the POA terminal 104 (that includes the POA dataform 106) and stored in the database 1000. The remote server 114 temporarily stores the purchase data while performing the lookup operation on the plurality of dataform information 1002 using the dataform 106. When the corresponding network address 1004 of the POA terminal 104 is obtained, the stored purchase data is forwarded to the POA terminal 104 for presentation to the customer 100, according to the retrieved network address. It is appreciated that the communication exchange between the device 102 and the remote server 114 may be that the dataform information 106 is first transmitted to the remote server 114 to obtain the corresponding network address, after which the network address is returned to the device 102. The device 102 than packetizes the network address and purchase and/or customer preference information data for transmission through the network 108 to the POA terminal 104.

Furthermore, the customer data 1006 may be logically linked to the POA terminal 104 entry such that customer data 1006 (including the customer preference information and purchase and/or inquiry information) may be transmitted to the POA terminal 104 for presentation to the customer 100. Additional data may be linked during over the course of the shopping process such that specials may be presented to the customer 100 in substantially real time while at the POA terminal 104.

It is to be appreciated that personally owned compatible m-commerce devices may be utilized with the disclosed system. The database 1000 may then include an association of unique device IDs (UDID) 1008 of a plurality of the portable devices 102 with the names 1010 of device owners such that when the customer 100 enters the store, the UDID 1008 is communicated to the store system, either manually by the customer or automatically detected by the store system, such that while the customer 100 shops, customer preference data can be retrieved from the preferences server 121 and presented to the customer 100 via the device 102 and/or the POA terminal 104. Manual communication can include selecting a combination of numbers of the device 102 for wireless transmission over the network 108 to the remote server 114. This can also include the customer 100 approaching a data entry device in the store to manually enter the customer name to indicate his or her presence in the store. The UDID 1008 of the device 102, or any other portable device with similar capabilities that the customer 100 chooses to register, would initially be provided to the store system when the customer 100 subscribes to the disclosed architecture. The customer 100 could than have multiple entries in the database 1000. Other information 1012 may also be included in the database 1000 to facilitate retrieval of additional advertising, promotions, and/or preference information for each customer, e.g., targeted data, prior shopping lists, etc.

It is appreciated that the POA terminal 104 can also be a wireless station such that any communication between the POA terminal 104 and the network 108 is performed wirelessly. Such wireless communication capability includes, but is not limited to, infrared, Bluetooth, and other wireless technologies. Nor is the dataform (106 and 302) limited to being an optically scanable barcode, but may be a code embedded into a transponder system such that proximity of the mobile device 102 to the POA terminal 104 triggers automatic activation of the transponder system to expose the encoded dataform code to the receiving system. It can be further appreciated that each of the POA terminal 104 and the mobile device 102 have dataforms associated therewith such that the dataforms of each could be scanned by the other when the customer approaches the POA terminal 104. This approach results in an association created between both dataforms at the remote m-commerce server 114 (and/or local m-commerce server 124) so that the purchase data can be retrieved and presented to the customer 104.

Furthermore, product and/or service data transmitted between the mobile device 102 and the POA terminal 104 is not limited to a textual format, but may include PDF, which as indicated hereinabove, includes text, data, biometrics, and graphics.

Figure 11:
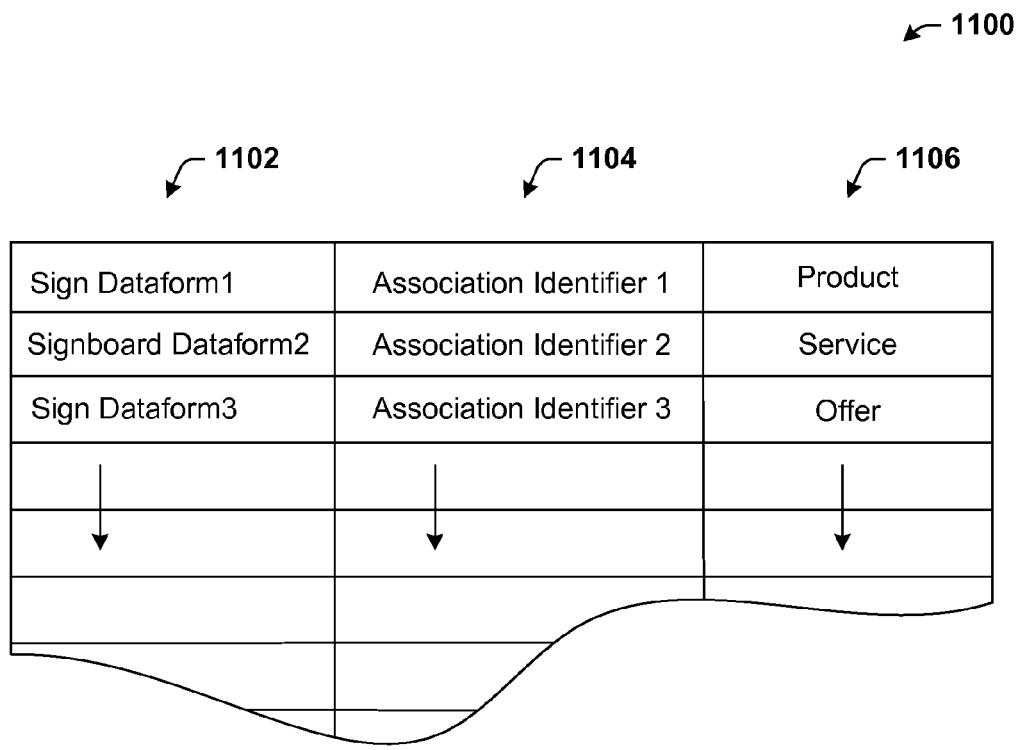
FIG. 11 illustrates an alternative database for storing location-based associations of sign dataforms.

Referring now to FIG. 11, there is illustrated an alternative or supplemental database 1100 to the database 1000 of FIG. 10 for storing location-based associations of sign and signboard dataforms. The database 1100 includes a table or similar data structure of a plurality of associations between dataforms 1102, corresponding identifiers 1104, and items 1106, which items 1106 include products, services, offers, or information identified by the signs and/or signboards.

Figure 12:
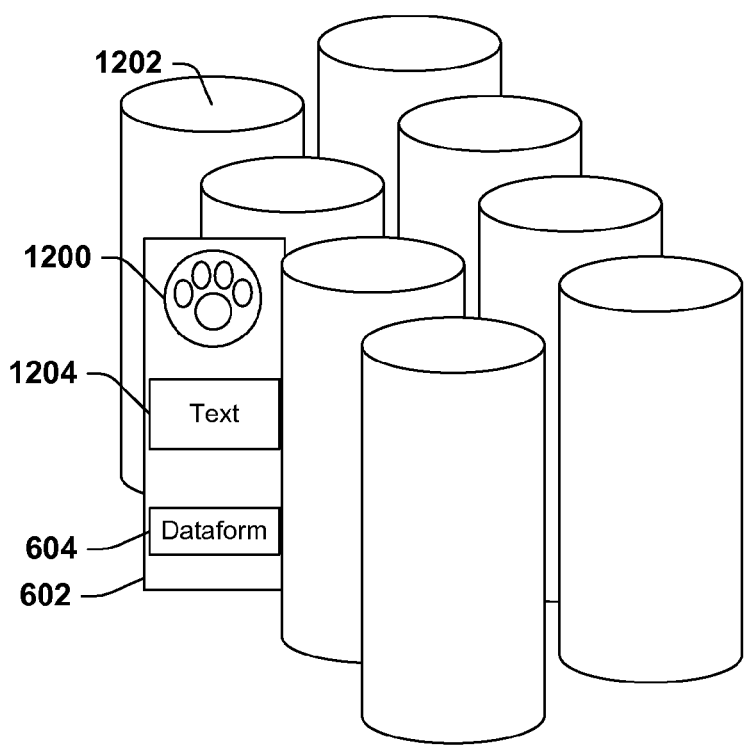
FIG. 12 illustrates a diagram of an implementation of the sign of the present invention.

Referring now to FIG. 12, there is illustrated a diagram of an implementation of the sign 602 of the present invention. As indicated hereinabove in the discussion of FIG. 6, the sign 602 may include the sign dataform 604 that for the particular instance of use, uniquely identifies a product/service to which the sign 602 is proximately placed, although proximate placement is not required. For example, the sign 602 can include a license plate graphic (here, a paw print 1200) that is uniquely associated with a promotional program and readily perceived by the customer 100 as he or she shops the store aisles. Thus customer attention is drawn to the license plate graphic and the product/service near to which the sign 602 is placed. In this implementation, the purchase of a program product 1202 will provide a benefit to the customer 100 if a member of the promotional program. The sign 602 may also include a text area 1204 that further describes the product/service, and perhaps more details about the promotional program, although this is not required. The sign 602 may be co-branded with products and/or services from several different manufactures and providers. Note that where utilized, the dataform 604 can also be imposed on the license plate graphic 1200. This would require that the sign 602 is uniquely associated with the item, and is not usable with other items of the store.

In application, the store will have numerous signs 602 placed in close proximity with products/services offered for purchase under the promotional program. The customer 100 need only to perceive the license plate graphic to quickly ascertain the location in the store of the promotional item. The customer device 102 is used to scan the license plate dataform 604 in order to purchase the promotional product and/or service, and/or to inquire further about the product/service/offering.

The sign 602 with dataform 604, and possibly without any other human readable text other then possibly a brand name, slogan, or generic identifying text, provides a new form of customer interaction and multimedia advertising where the customer, upon seeing an identifying brand, logo, or shape of the sign, scans a dataform—which identifies interest or intent. The system then provides product information, offers, or other data based on the relevancy of the scanned and past customer history. The customer "self targets" himself or herself when he or she scans the sign dataform 604.

Since nothing specific such as product name or offer needs to be printed on the sign 602, it can be reused repeatedly by merely moving it next to another product and service, and using an administrative application to reassociate it to a different product or service on the server database. Customers scan the sign dataform to signify interest or intent. By interacting with a backend data system, highly relevant and targeted information and offers can be provided to the customer in lieu of fixed text normally contained on a sign.

A customer's location in the store can also be determined when the sign dataform 604 is scanned. This location information may be used for transmitting an offer or information not associated with the specific product on the sign, but simply by customer's the location in the store. Thus, by knowing the customer's location, the product and/or service information can be broadcast to the device 502 alerting the customer of promotions her or she is about to pass in the store aisle. In more robust implementations, by simply knowing which dataforms are scanned in an aisle, the direction of customer movement in the aisle, and in the store, in general, can be determined, further facilitating the presentation of promotions to the customer based upon direction of movement through the store. Still further, knowing the time at which the dataforms were scanned offers the capability of determining the velocity at which the customer moves up an aisle or through various areas of the store. The velocity information can be used to expedite the broadcast and presentation of product and/or service information to the customer via the scanning device 502 prior to reaching the location of the product and/or service in the aisle or store.

Figure 13:
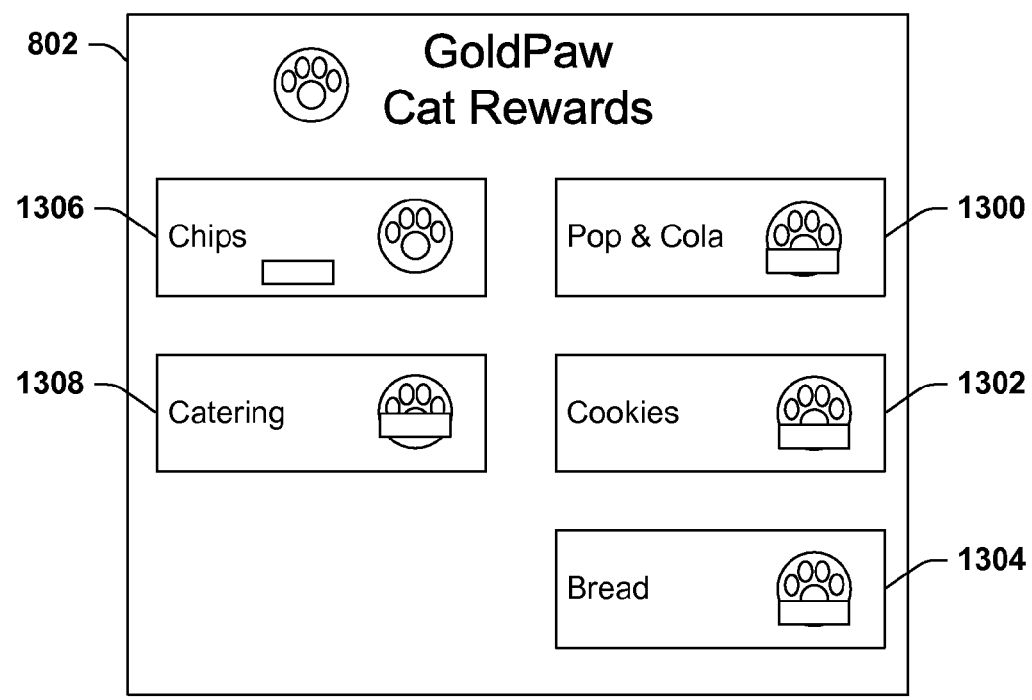
FIG. 13 illustrates a signboard implemented according to the present invention.

Referring now to FIG. 13, there is illustrated a signboard 802 implemented according to the present invention. The signboard 802 may, although it is not required, provide a listing of items that are part of the promotional program, whereas the sign 602 typically facilitates the purchase and information retrieval of one product/service/offering. However, where a rewards program (based on points or some other accounting method) is implemented, it may be beneficial to include as many of the top points reward items on the signboard 802. Continuing with the "paw" example, if the store were running a GoldPaw Cat Rewards program, each item in the store associated with the program would have the sign 602 proximate thereto on the shelf, and alternatively, or in conjunction with, the signboard 802, which would be placed at a location away from the items listed thereon to facilitate quick perusal and purchase of the program items. As illustrated, the signboard 802 includes a listing of program items, for example, a Pop & Cola product item 1300, a Cookies product item 1302, a Bread product item 1304, a Chips product item 1306, and a Catering service item 1308. Each item has the paw graphic associated therewith and respective dataform for scanning. Note that the dataform can be imposed on the graphic or be placed separate therefrom, insofar as the dataform is clearly associated with the respective item from the perspective of the customer 100. Thus the customer 100 need not walk the store aisles in order to perceive the program items offered for sale, but can perceive the one or more signboards 802 placed strategically around the store to more quickly choose which, if any, promotional items he or she wishes to purchase.

The signboard 802 with dataforms, and when implemented, without any other human readable text other then possibly a brand name, slogan, or generic identifying text, provides a new form of customer interaction and multimedia advertising where the customer, upon seeing a "high level" description or offer, scans the dataform, which then identifies interest or intent. The system then provides product information, offers, or other data based on the relevancy of the scanned and past customer history. This represents a new form of in-store multimedia advertising and promotion. The customer "self targets" himself or herself when he or she scans the specific dataform next to the relevant text or item on the signboard 802. Customers scan the specific signboard dataform simply to signify interest or intent. By interacting with a backend data system, highly relevant and targeted information and offers can be provided to the customer 100 in lieu of fixed text normally contained on the sign. A customer's location in the store can be determined when any of the sign dataforms are scanned. This might be used for an offer or information not associated with the specific product but the location in the store. Thus scanning of the signboard dataform(s) may also facilitate a reminder function supported by the system such that as the customer shops throughout the store, his or her location may be automatically determined within the shopping environment. As the customer approaches a scanned product, the mobile device 102 may be activated to "remind" the customer that this is a product and/or service that was previously tagged for interest at the signboard. Furthermore, the location of the customer may be determined as being at a particular signboard when the customer scans one or more of the dataforms on the corresponding signboard.

In all scenarios described hereinabove, when shoppers scan dataforms throughout the store, the scanning process can be analyzed to determine where shopper groupings or individuals may be, such that specials may be broadcast or presented to the shoppers to facilitate a more focused perusal of the items in that area. The feedback provided to the store system by customers scanning dataforms throughout the store facilitates many different types of programs to enhance the shopping experience and to target individual shoppers or groups of shoppers.

As mentioned hereinabove, each item of the sign 602 and the signboard 802 can be associated with a coupon, such that the coupon information is electronically and automatically processed at the close of the purchase transaction. Additionally, when the customer 100 scans a dataform, a coupon notification is presented to the customer via the device 102, and then transmitted for processing at the close of the purchase transaction.

Note that for scenarios described hereinabove, functionality of the remote m-commerce server 114 can also be performed by the local m-commerce server 124, and vice versa.

Figure 14A:
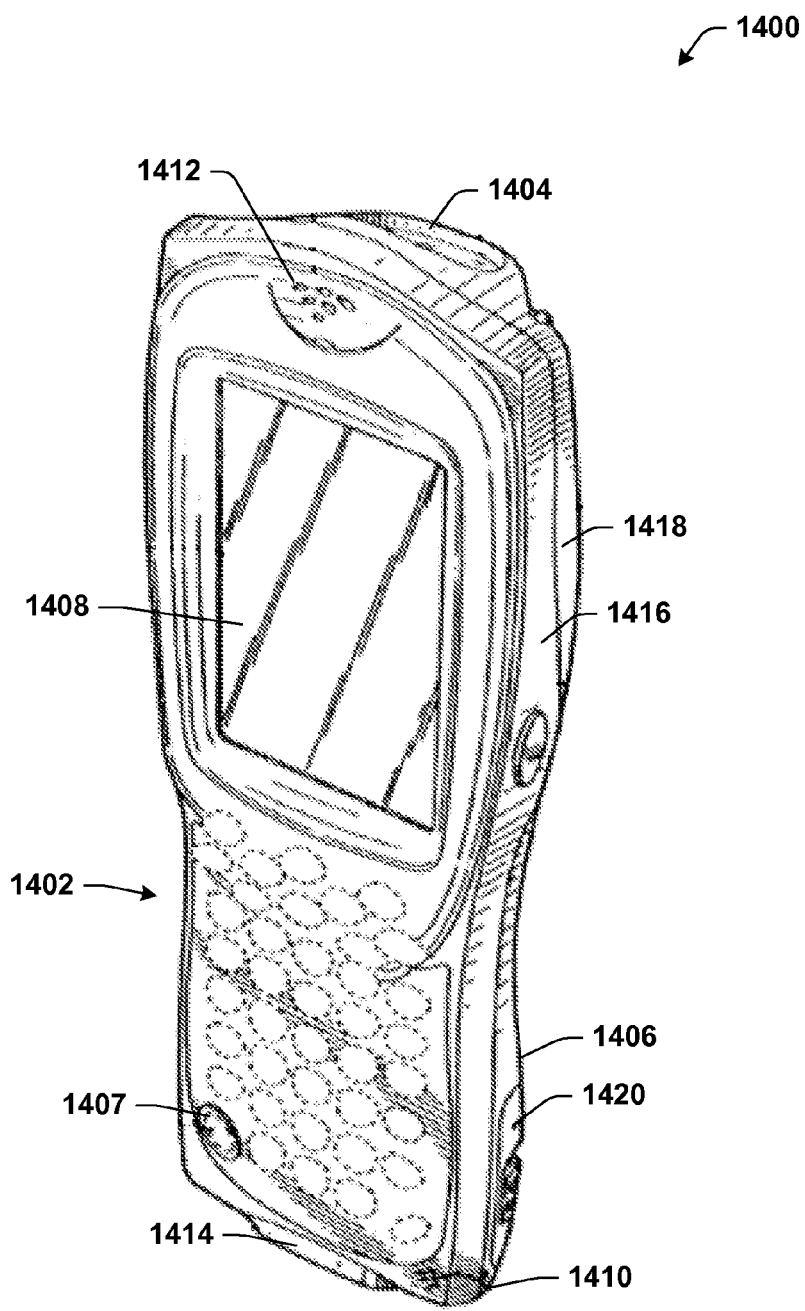
FIG. 14A and FIG. 14B illustrate respectively front and rear views of a portable m-commerce device adapted to operate in accordance with the disclosed architecture.
Figure 14B:
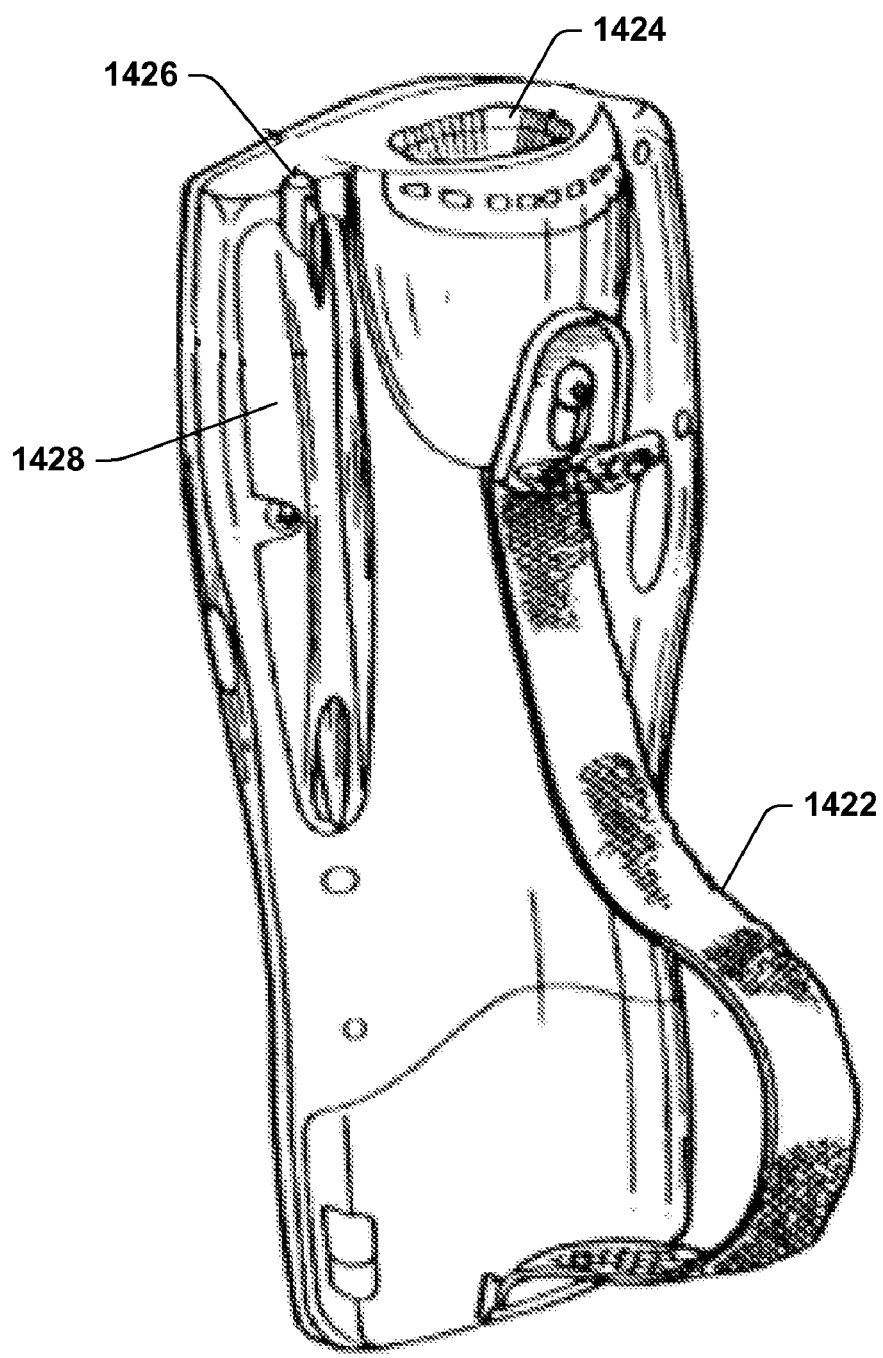

It is to be further to be appreciated that dataforms may be consolidated into a catalog of all products and/or services provided by that store, such the customer may simply go to a catalog location and scan items for purchase, further information, or reminder for purchase throughout the store. Of course, the products and/or services may be categorized according to type, in alphabetical order, in association with images, audio and video files (e.g., for preparing or working with a product), and hyperlinks to other products, services, or website locations, etc, Referring now to FIG. 14A and FIG. 14B, there is illustrated respectively front and rear views of a portable m-commerce device 1400 (similar to portable devices 102 and 502) adapted to operate in accordance with the disclosed architecture. FIG. 14A is a pictorial representation the front view thereof, and FIG. 14B is a pictorial representation of the rear view. In this particular example, the portable m-commerce 1400 is a hand-held terminal used in a wireless communication network for tracking inventory, scanning and storing data, etc. The user may manually interface with the device 1400 via a keypad 1402, automatically input data by reading a dataform (not shown) in the format of, e.g., bar code, image, magnetic media with a dataform reading component 1404, the dataform reading component 1404, including, e.g., a bar code scanner/imaging apparatus or magnetic reader, etc., the operation of all which can occur independent of the device 1400 being in operative wired/wireless communication with a network, e.g., a LAN, WAN, or WWAN (Wireless WAN). When the device 1400 does not include wireless communication capability, e.g., an RF means, to provide for real time communications of data to the LAN/WAN, the data is stored in memory within the device 1400. The memory can take the form non-volatile storage such as a micro-drive disk storage unit, RAM memory, flash memory, etc. When the device 1400 is connected to a LAN/WAN, the stored data can be transmitted to a thereacross to a network storage node, e.g., a network client or server computer (not shown). It is to be appreciated that the portable device 1400 can also be any other type of device that is portable in nature, and having electronic circuitry therein in accordance with the present invention. For example, the portable device could be a laptop computer, notebook computer, a Personal Data Assistant, cellular telephone, pager, any of which employs an onboard power source, such as batteries.

The device 1400 may include, but is not limited to, the following components: a housing 1406 for providing a ruggedized enclosure in which the device hardware and software are contained; a power button 1407 turning the device on and off; a display 1408 for displaying information to a user, and where the display 1408 is an interactive interface device such as a touch screen display, allowing the user to interact manually to input information and/or operational commands; the keypad 1402 including a set of user interface keys for facilitating to input of information and/or operational commands by the user, the keypad 1402 including full alphanumeric capability, function keys, control keys, etc.; the dataform reading device 1404, e.g., bar code scanner, imager, magnetic medium reader, etc.; a microphone 1410 for receiving audio input; a speaker for providing audio output to the user, whether rudimentary beeps or modulated verbal signals; and, one or more communication ports (e.g., USB, IEEE1394, RS-232, IrDA), either provided separately through the housing 1406, and/or via a mating connector (not shown). The device 1400 can include a lighting element such as an LED that is illuminated to signal whether or not the dataform has been successfully read. The device 1400 may also include internal circuitry to support all operations of the device 1400, including but not limited to, bar code scanning and processing capability, RFID capability, data processing and display, wired and wireless communications, power monitoring, etc.

The housing 1406 is an elongated enclosure of a size and structure that includes contours to fit conveniently into the open palm of the user. The housing 1406 may be comprised of a number of mating shell portions such as, for example, a front shell 1416 and rear shell 1418, as well as a battery pack lid 1420.

In FIG. 14B, the housing 1406 is illustrated to include a hand strap 1422 for user comfort, and to aid the user in retaining the device 1400 in his or her hand. The device 1400 also includes a window 1424 through which the dataform reader 1404 is able to read the dataform of a label or object presented for reading. To facilitate keypad and/or touch screen use by the user, a pen 1426 is provided in a pen holder 1428.

Of course, other communication interface technologies may be utilized with the disclosed connector system. Popular serial and parallel communication technologies may be utilized, e.g., $I^2C$ (Inter-IC bus), RS-232, USB (Universal Serial Bus), IEEE 1394 (also known as FireWire™).

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method presenting user transaction data to a user, comprising:
   a user receiving an m-commerce device capable of reading a dataform;
   storing an item of commerce-related data in response to the m-commerce device reading an item of commerce dataform; and
   presenting the item of commerce-related data to the user via a terminal in response to a device dataform associated with at least one of the in-commerce device and the terminal,
   wherein the terminal determines a direction of movement of the user from a comparison of locations of at least two dataforms that have been read, and communicates additional product-related and/or service based upon the direction of movement of the user.

2. The method of claim 1 presenting at least one of advertising information and user preferences information to the user via the terminal in response to the device dataform being read.

3. The method of claim 1, the terminal presenting information of secondary items of commerce that is related to the item of commerce.

4. The method of claim 1, the device dataform associated with the m-commerce device such that the terminal reads the in-commerce device dataform and automatically presents the item of commerce-related data to the user via the terminal.

5. The method of claim 1, the device dataform associated with the terminal such that the m-commerce device reads the terminal device dataform, in response to which the terminal automatically presents the item of commerce-related data to the user.

6. The method of claim 1, the item of commerce data stored in at least one of the m-commerce device, a server local to the terminal, and a server remote to the terminal.

7. The method of claim 1, further comprising presenting user preferences information to the user via at least one of the m-commerce device and the terminal, the preferences information presented by, automatically accessing a remote web site of preferences information; retrieving the preferences information; and presenting the preferences information to the user along with the item of commerce-related data.

8. The method of claim 1, the user confirming purchase of selected items of commerce via at least one of the m-commerce device and the terminal.

9. The method of claim 1, further comprising transmitting the item of commerce-related data from the in-commerce device after at least one of a single item of commerce dataform has been read and a plurality of item of commerce dataforms have been read.

10. The method of claim 1, the item of commerce-related data transmitted wirelessly from the m-commerce device over a network to the terminal, which network comprises at least one of a global communication network, LAN, and WAN.

11. The method of claim 1, further comprising transmitting device dataform data to an intermediate server to perform a look-up operation in order to determine the location of the terminal.

12. The method of claim 1, the terminal dataform is at least one of a bar code, encoded in association with a transponder system, encoded in association with an RFID system, and a magnetically encoded media.

13. The method of claim 1, the item of commerce dataform included in an item of commerce logo.

14. The method of claim 1, further comprising transmitting coupon data to at least one of the m-commerce device and terminal in response to the item of commerce dataform being read.

15. The method of claim 14, the coupon data utilized at the point of sale.

16. The method of claim 1, the m-commerce device being a personal device such that the device dataform of the m-commerce device is read when the user enters a store, in response to which user preferences information is automatically transmitted to the m-commerce device.

17. The method of claim 1, the item of commerce dataform included on at least one of a sign and a signboard, the sign is reusable such that the associated item of commerce dataform is reassociated with a second item of commerce at a later time.

18. A method presenting user transaction data to a user, comprising:
   a user receiving an in-commerce device capable of reading a dataform;
   storing an item of commerce-related data in response to the in-commerce device reading an item of commerce dataform;
   transmitting the stored item of commerce-related data to a central server, the central server storing the item of commerce-related data in association with the user;
   reading a terminal dataform of a terminal with the in-commerce device; transmitting terminal dataform data of the terminal dataform to the central server;
   retrieving and transmitting the item of commerce-related data associated with the terminal dataform data to the terminal; and
   presenting the item of commerce-related data to the user via the terminal,
   wherein the terminal determines a direction of movement of the user from a comparison of locations of at least two dataforms that have been read, and communicates additional product-related and/or service based upon the direction of movement of the user.

19. The method of claim 18, further comprising presenting user preferences information to the user via at least one of the m-commerce device and the terminal, the preferences information presented by, automatically accessing a remote web site of preferences information; retrieving the preferences information; and presenting the preferences information to the user along with the item of commerce-related data.

20. The method of claim 18, the dataform is at least one of a bar code and portable data file format.

* * * * *

UNITED STATES PATENT AND TRADEMARK OFFICE
CERTIFICATE OF CORRECTION

| | | |
|---|---|---|
| PATENT NO. | : 7,668,758 B2 | Page 1 of 1 |
| APPLICATION NO. | : 11/608565 | |
| DATED | : February 23, 2010 | |
| INVENTOR(S) | : Petrovich | |

It is certified that error appears in the above-identified patent and that said Letters Patent is hereby corrected as shown below:

In Column 21, Line 21, in Claim 1, delete "in-commerce" and insert -- m-commerce --, therefor.

In Column 21, Line 37, in Claim 4, delete "in-commerce" and insert -- m-commerce --, therefor.

In Column 21, Line 58, in Claim 9, delete "in-commerce" and insert -- m-commerce --, therefor.

In Column 22, Line 32, in Claim 18, delete "in-commerce" and insert -- m-commerce --, therefor.

In Column 22, Line 35, in Claim 18, delete "in-commerce" and insert -- m-commerce --, therefor.

In Column 22, Lines 40-41, in Claim 18, delete "in-commerce" and insert -- m-commerce --, therefor.

Signed and Sealed this
Twenty-fourth Day of July, 2012

David J. Kappos
*Director of the United States Patent and Trademark Office*